US012560078B2

(12) United States Patent
Neal, III et al.

(10) Patent No.: US 12,560,078 B2
(45) Date of Patent: Feb. 24, 2026

(54) PREDICTIVE PUMP MAINTENANCE BASED UPON UTILIZATION AND OPERATING CONDITIONS

(71) Applicant: Halliburton Energy Services, Inc., Houston, TX (US)

(72) Inventors: Charles E. Neal, III, Duncan, OK (US); Derek R. Williams, Duncan, OK (US); Craig Allen Sneed, Duncan, OK (US); Sunny L. Oliver, Houston, TX (US); Keith Edward Blaschke, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/610,893

(22) Filed: Mar. 20, 2024

(65) Prior Publication Data

US 2024/0229637 A1 Jul. 11, 2024

Related U.S. Application Data

(62) Division of application No. 17/529,061, filed on Nov. 17, 2021, now Pat. No. 12,012,842.

(51) Int. Cl.
*E21B 47/008* (2012.01)
*G06F 18/214* (2023.01)
*G06N 20/00* (2019.01)

(52) U.S. Cl.
CPC .......... *E21B 47/008* (2020.05); *G06F 18/214* (2023.01); *G06N 20/00* (2019.01); *E21B 2200/20* (2020.05)

(58) Field of Classification Search
CPC .......... E21B 21/08; E21B 41/00; E21B 47/06; E21B 44/00; E21B 47/008; E21B 44/02; E21B 2200/20
See application file for complete search history.

(56) References Cited

U.S. PATENT DOCUMENTS

| | | | |
|---|---|---|---|
| 5,624,182 | A | 4/1997 | Dearing, Sr. |
| 7,720,574 | B1 | 5/2010 | Roys |

(Continued)

FOREIGN PATENT DOCUMENTS

| | | |
|---|---|---|
| CA | 2999968 C | 6/2020 |
| CN | 110838155 A | 2/2020 |

(Continued)

OTHER PUBLICATIONS

Foreign Communication from Related Application-International Search Report and Written Opinion of the International Searching Authority, International Application No. PCT/US2021/058718, dated Jul. 26, 2022, 12 pages.

(Continued)

*Primary Examiner* — Zakiya W Bates
(74) *Attorney, Agent, or Firm* — Conley Rose, P.C.; Rodney B. Carroll

(57) ABSTRACT

A computer implemented method of predicting a future maintenance event of a pumping equipment on a wellbore pumping unit comprising loading a pump usage log and a pump maintenance log into a predictive maintenance model. The predictive maintenance model is trained by a machine learning process with a historical database of completed pumping jobs. The predictive maintenance model determines a probability of a future maintenance event in response to the current pump usage. The unit controller displays an alert of the remaining pump life in comparison to a threshold value for a recommended pump maintenance period or a required pump maintenance period.

18 Claims, 8 Drawing Sheets

(56) References Cited

U.S. PATENT DOCUMENTS

| 10,253,625 | B2 | 4/2019 | Williams |
| 10,392,918 | B2 | 8/2019 | Harkless |
| 10,801,491 | B2 | 10/2020 | Urdaneta |
| 11,002,269 | B2 | 5/2021 | Pal |
| 11,643,908 | B1 | 5/2023 | Williams et al. |
| 11,852,134 | B2 | 12/2023 | Williams et al. |
| 11,939,862 | B2 | 3/2024 | Williams et al. |
| 12,012,842 | B2 | 6/2024 | Neal, III et al. |
| 2003/0072208 | A1 | 4/2003 | Rondeau |
| 2003/0168258 | A1 | 9/2003 | Koederitz |
| 2006/0052903 | A1 | 3/2006 | Bassett |
| 2012/0025997 | A1 | 2/2012 | Liu |
| 2016/0194942 | A1 | 7/2016 | Wiegman |
| 2017/0002644 | A1 | 1/2017 | Chen |
| 2017/0022788 | A1 | 1/2017 | Oehring |
| 2017/0226842 | A1 | 8/2017 | Omont |
| 2018/0363459 | A1 | 12/2018 | Williams |
| 2019/0128254 | A1 | 5/2019 | Shichi |
| 2019/0317488 | A1 | 10/2019 | Al-Maghlouth |
| 2020/0103889 | A1 | 4/2020 | Cella |
| 2020/0191130 | A1 | 6/2020 | Van Der Spek |
| 2020/0347713 | A1 | 11/2020 | Omont |
| 2020/0355067 | A1 | 11/2020 | Williams |
| 2020/0362664 | A1 | 11/2020 | Urdaneta |
| 2021/0306804 | A1 | 9/2021 | Adler |
| 2022/0003229 | A1* | 1/2022 | Mu ......................... F04B 47/02 |

FOREIGN PATENT DOCUMENTS

| CN | 210402440 | 4/2020 |
| CN | 212272574 | 1/2021 |
| JP | 4766814 B2 | 9/2011 |
| KR | 101154275 B1 | 6/2012 |
| KR | 20170030823 A | 3/2017 |
| KR | 20180044086 A | 5/2018 |
| KR | 20200075229 A | 6/2020 |
| WO | 03076764 A2 | 9/2003 |
| WO | 2016160459 A2 | 10/2016 |
| WO | 2021050943 A1 | 3/2021 |
| WO | 2023080904 A1 | 3/2021 |
| WO | 2023080905 A1 | 5/2023 |
| WO | 2023091149 A1 | 5/2023 |

OTHER PUBLICATIONS

Foreign Communication from Related Application-International Search Report and Written Opinion of the International Searching Authority, International Application No. PCT/US2021/058720, dated Aug. 1, 2022, 12 pages.

Foreign Communication from Related Application-International Search Report and Written Opinion of the International Searching Authority, International Application No. PCT/US2021/060309, dated Aug. 9, 2022, 12 pages.

* cited by examiner 300     302     304     306

| Pressure Bucket (psi) | Rate Bucket (bpm) | Volume (bbls) |
|---|---|---|
| 0 - 1000 | 0 - 2 | 100.0 |
| 0 - 1000 | 2 - 4 | 200.0 |
| 0 - 1000 | 4 - 6 | 80.0 |
| 0 - 1000 | 6 - 8 | 60.0 |
| 0 - 1000 | 8 - 10 | 20.0 |
| 0 - 1000 | 10 - 12 | 5.0 |
| 1000 - 2000 | 0 - 2 | 85.0 |
| 1000 - 2000 | 2 - 4 | 90.0 |
| 1000 - 2000 | 4 - 6 | 75.0 |
| ... | ... | |

310A — 310B — 310C — 310D — 310E — 310F — 310G — 310H — 310I — 316

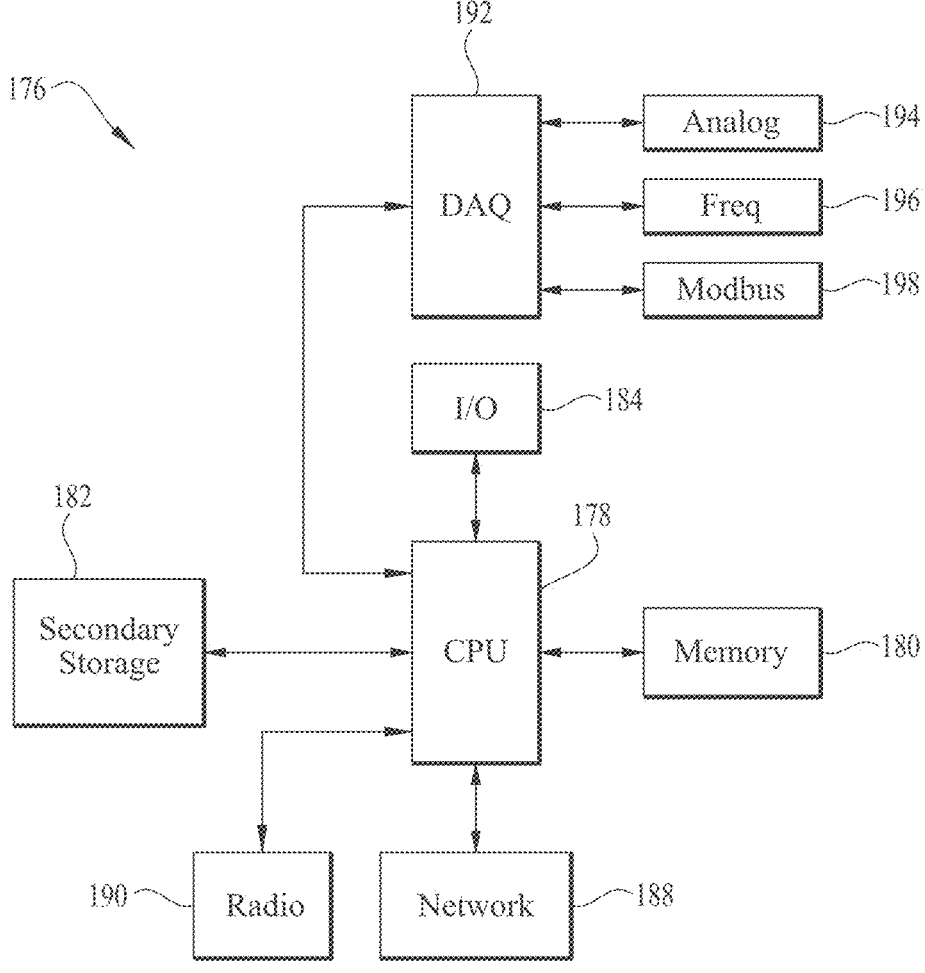
_Fig. 5_

Wellsite

Service Center

Computer

Maintenance

Model

Schedule

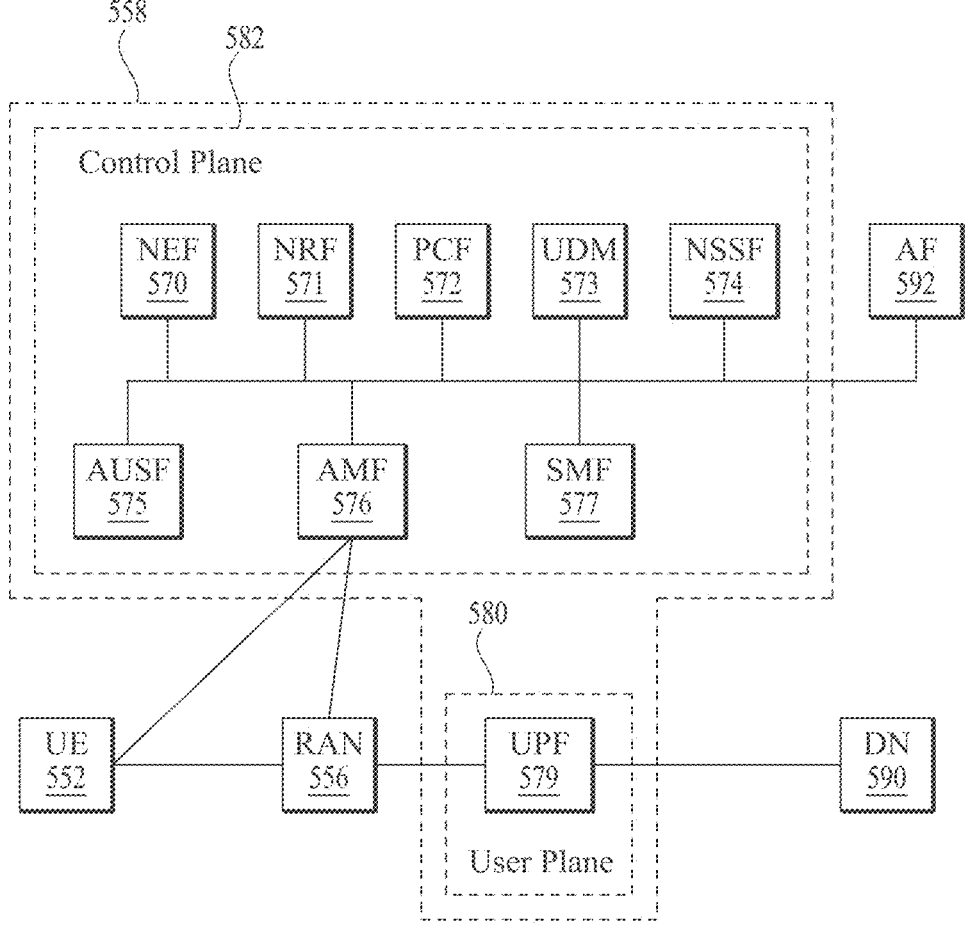
_FIG. 8B_

PREDICTIVE PUMP MAINTENANCE BASED UPON UTILIZATION AND OPERATING CONDITIONS

CROSS-REFERENCE TO RELATED APPLICATIONS

The present application is a divisional of and claims priority to U.S. patent application Ser. No. 17/529,061 filed Nov. 17, 2021 and entitled "Predictive Pump Maintenance Based Upon Utilization and Operating Conditions," which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In oil and gas wells a primary purpose of a barrier composition such as cement or a sealant is to isolate the formation fluids between zones, also referred to as zonal isolation and zonal isolation barriers. Cement is also used to support the metal casing lining the well, and the cement provides a barrier to prevent the fluids from damaging the casing and to prevent fluid migration along the casing.

Typically, an oil well is drilled to a desired depth with a drill bit and mud fluid system. A metal pipe (e.g., casing, liner, etc.) is lowered into the drilled well to prevent collapse of the drilled formation. Cement is placed between the casing and formation with a primary cementing operation. One or more downhole tools may be connected to the casing to assist with placement of the cement.

In a primary cementing operation, a cement blend tailored for the environmental conditions of the wellbore is pumped into the wellbore. This pumping operation may utilize pumping equipment, which may include one or more pumps controlled by a controller such as a main pump and supply pumps. The pumping equipment may require routine maintenance and, in some cases, repair of one or more components. Routine maintenance performed on a predetermined schedule to inspect and possibly repair pumping equipment may be unneeded and may not reveal pending maintenance issues. This unneeded routine maintenance can remove equipment from service and lower the utilization rate of the pumping equipment. Improved methods of predicting maintenance on pumping equipment is desirable.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a block diagram of a unit controller according to an embodiment of the disclosure.

FIG. 8B is a block diagram of a 5G core network according to an embodiment of the disclosure.

DETAILED DESCRIPTION

Figure 1:
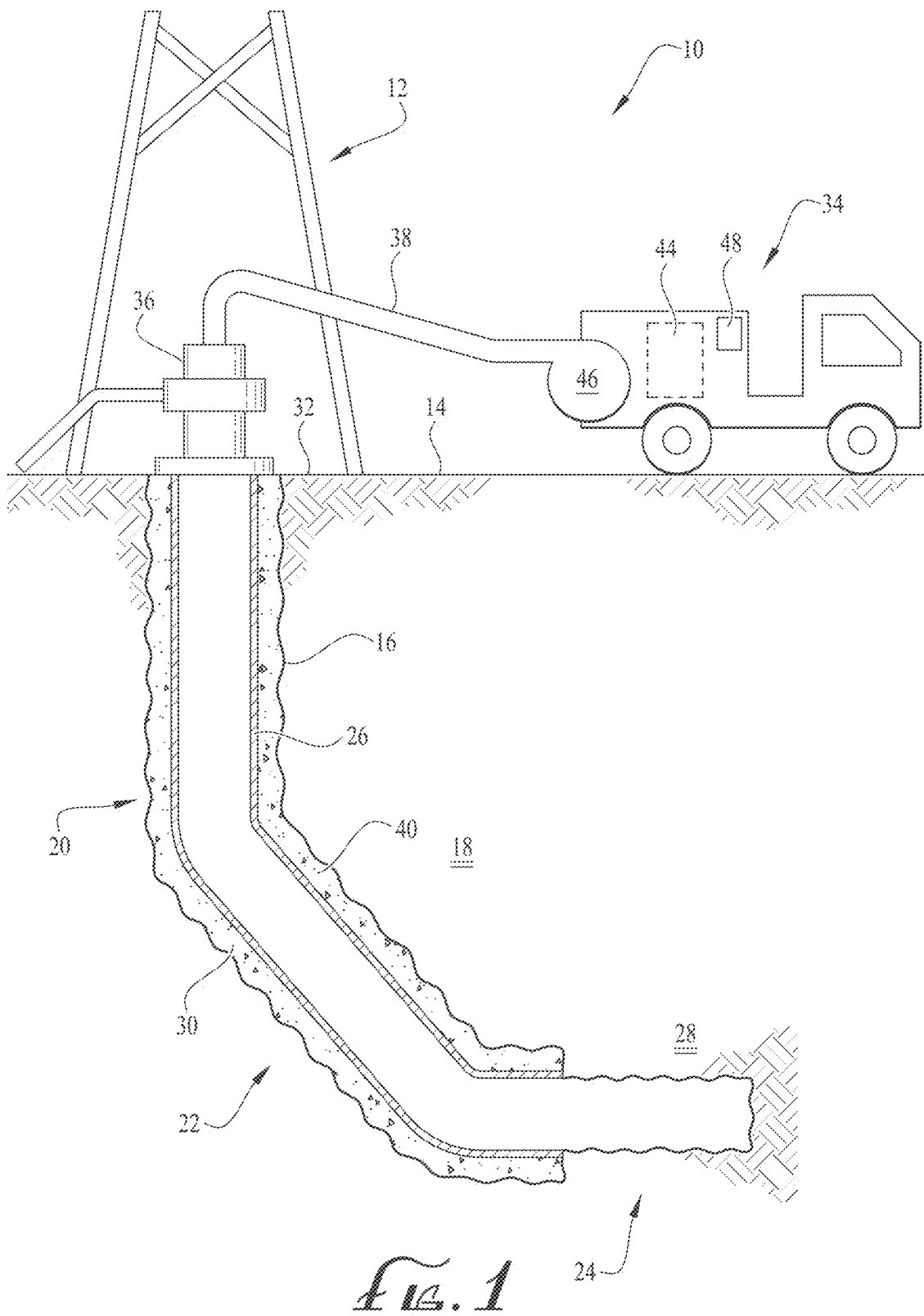
FIG. 1 is an illustration of an operating environment at a wellsite according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Oil well construction can follow a series of construction stages including drilling, cementing, and completion. Each stage can be carried out using specialized equipment and materials to carry out a series of steps to complete each stage.

Examples of the various equipment that may be used at various stages include various configurations, types, and/or sizes of pumping equipment. For example, during the drilling stage, an oil well can be drilled with a drill bit, a mud system, and a mud pump. As the drill bit penetrates the earth strata, a drilling mud is pumped down a drill string to bring cuttings back to surface, an example of which includes a reciprocating (e.g., plunger-type) pump. The mud pumping equipment may include a mixing system for blending dry mud blend with a liquid, e.g., water, to produce a mud slurry.

Also, for example, during the cementing stage, a cement pump may be used to introduce a cementitious slurry, e.g., a cement composition, into the annulus formed between the casing and the wellbore. The cement typically used for cementing oil wells can be a Portland cement comprised of a hydraulic cement with a source of free lime and alkali ions, a source of calcium carbonate, a source of calcium sulfate and an organic component. The mixing system can blend the dry cement with water to produce the cement slurry.

In another example, during the completion stage, a blender and high pressure pump may be used to fracture a formation with a proppant slurry. The blender, also referred to as a blender unit, may include a mixing system for blending proppant, e.g., sand, and water with various additives, e.g., friction reducers, to produce the proppant slurry. The high pressure pumps, also referred to as fracturing units, may deliver the proppant slurry into the wellbore with sufficient pressure to fracture the formation and deposit the proppant into the fractures.

The various pumping equipment used at varying well construction stages may include or be communicatively coupled to a unit controller. The unit controller may comprise a computer system with one or more processors, memory, input devices, and output devices. The unit controller may be programmable with one or more pumping procedures for the mixing and placement of wellbore treatments. The unit controller can be communicatively connected to various components of the pumping equipment including the mixing system and main pump. For example, the unit controller may be communicatively coupled to a mixing drum, a water pump, a plurality of valves, an additive system, a main pump, and a data acquisition system. The unit controller can establish control over the various components of the pumping equipment, e.g., the mixing system, with the data acquisition system providing feedback of the pumping operation. In some cases, the unit controller of two or more pumping equipment assemblies may be communicatively connected so that the pumping equipment assemblies cooperatively work together. For example, the blender and one or more high pressure pumps may cooperatively deliver proppant slurry to the wellbore.

The delivery of the wellbore treatment, e.g., cement slurry, from the pumping equipment at a desired flowrate can depend on the health of the pumping equipment. The health of the pumping equipment may decline based on various factors including the accumulated volume of treatments mixed, the type of treatments pumped, the amount of time in operation, or the number of jobs performed. Various components of the pumping system may encounter wear and general degradation of operating ability during normal operation from sequential jobs. Service personnel can perform diagnostic tests on the various components of the pumping system before or after a job, however, in some cases the diagnostic tests can be inconclusive. In other cases, the pumping equipment can be placed on a predetermined schedule for inspection and maintenance. However, the predetermined maintenance schedule can occur too soon or too late depending upon various factors, which may be difficult to characterize and/or quantify. Additionally, failures of the pumping equipment can occur even when the predetermined maintenance schedule is followed. As such, improved methods for predicting when maintenance will be needed for pumping equipment is needed.

Disclosed herein are methods and systems related to determining the maintenance schedule of the pumping equipment. In some embodiments, the disclosed methods and systems can include tracking the type and duration of wellbore treatments. A monitoring application executing on the unit controller can generate a log of the type and duration of the pumping treatment. The unit controller can also generate a log of the type and occurrence of maintenance performed on the pumping equipment. The unit controller can compare the type, volume, and duration of wellbore treatments to a predictive model to determine when maintenance is recommended or required. The predictive model can be developed by a machine learning process accessing a historical database of pumping operations. The unit controller can alert the field personnel via the interactive display when maintenance is recommended for pumping equipment. The alert from the monitoring application can include i) an amount of volume remaining until maintenance is recommended, ii) when the volume pumped passes a threshold amount, and iii) a possible failure mode based on feedback from the predictive model.

Disclosed herein is a method of predicting pumping equipment maintenance based on pumping equipment utilization. A monitoring application can generate a log file of the volumes and rates of the wellbore treatment pumped by the pumping equipment. The unit controller can transmit the log file to a predictive model to predict a future maintenance event. A machine learning process can utilize a historical database as a training data set to develop the model. The method of predicting pumping equipment maintenance can increase the reliability of the pumping unit.

FIG. 1 illustrates a wellsite environment 10, according to one or more aspects of the presently-disclosed subject matter. The wellsite environment 10 comprises a drilling or servicing rig 12 that extends over and around a wellbore 16 that penetrates a subterranean formation 18 for the purpose of recovering hydrocarbons. The wellbore 16 can be drilled into the subterranean formation 18 using any suitable drilling technique. While shown as extending vertically from the surface 14 in FIG. 1, the wellbore 16 can also be deviated, horizontal, and/or curved over at least some portions of the wellbore 16. For example, the wellbore 16, or a lateral wellbore drilled off of the wellbore 16, can have a vertical portion 20, a deviated portion 22, and a horizontal portion 24. Portions or all of the wellbore 16 can be cased, open hole, or combination thereof. For example, a first portion extending from the surface can contain the casing string 26, also referred to as a casing string, and a second portion can be a wellbore drilled into a subterranean formation 28. A primary casing string 26 can be placed in the wellbore 16 and secured at least in part by cement 30.

The servicing rig 12 can be one of a drilling rig, a completion rig, a workover rig, or other structure and supports operations in the wellbore 16. The servicing rig 12 can also comprise a derrick, or other lifting means, with a rig floor 32 through which the wellbore 16 extends downward from the servicing rig 12. In some cases, such as in an off-shore location, the servicing rig 12 can be supported by piers extending downwards to a seabed. Alternatively, the servicing rig 12 can be supported by columns sitting on hulls and/or pontoons that are ballasted below the water surface, which can be referred to as a semi-submersible platform or floating rig. In an off-shore location, a casing can extend from the servicing rig 12 to exclude sea water and contain drilling fluid returns.

In an embodiment, the wellbore 16 can be completed with a cementing process by way of which a cement 30 is disposed in an annular space 40 between the casing string 26 and the wellbore 16. A pump unit 34, also called cement pumping equipment, can be fluidically connected to a wellhead 36 by a supply line 38. The wellhead 36 can be any type of pressure containment equipment connected to the top of the casing string 26, such as a surface tree, production tree, subsea tree, lubricator connector, blowout preventer, or combination thereof. The wellhead 36 can anchor the casing string 26 at surface 14. The wellhead 36 can include one or more valves to direct the fluid flow from the wellbore and one or more sensors that gather pressure, temperature, and/or flowrate data. In operation, the pump unit 34 can pump a volume of cementitious slurry, which may be specifically tailored to the wellbore, though the supply line 38, through the wellhead 36, down the casing string 26, and into the annular space 40. The supply line 38 may be referred to as a high pressure line.

The cement 30 can be Portland cement or a blend of Portland cement with various additives to tailor the cement for the wellbore environment. For example, retarders or accelerators can be added to the cementitious slurry to slow down or speed up the curing process. In some embodiments, the cement 30 can include a polymer designed for high temperatures. In some embodiments, the cementitious slurry can include additives such as fly ash to change the density, e.g., decrease the density, of the cementitious slurry.

The pump unit 34, also referred to as a wellbore pump unit, may include mixing equipment 44, pumping equipment 46, and a unit controller 48. The mixing equipment 44 can be in the form of a jet mixer, recirculating mixer, a batch mixer, a single tub mixer, or a dual tub mixer with a mixing device and a liquid delivery system. The mixing equipment 44 can combine a dry ingredient, e.g., cement, with a liquid, e.g., water, for pumping via the pumping equipment 46 into the wellbore 16. The liquid delivery system comprises a supply pump, a flow control valve, and sensors. The pumping equipment 46 can be a centrifugal pump, piston pump, or a plunger pump. The unit controller 48 may establish control of the operation of the mixing equipment 44 and the pumping equipment 46. The unit controller 48 can operate the mixing equipment 44 and the pumping equipment 46 via one or more commands received from the service personnel as will be described further herein. Although the pump unit 34 is illustrated as a truck, it is understood that the pump unit 34 may be skid mounted or trailer mounted. Although the pump unit 34 is illustrated as a single unit, it is understood that there may be 2, 3, 4, or any number of pump units 34 fluidically coupled to the wellhead 36, for example, via a fluid manifold.

Although the embodiment of FIG. 1 describes the wellsite environment 10 in the context of a cementing operation, in an additional or alternative embodiment, for example, in the context of a drilling or completion operation, a pump unit similarly-situated to the pump unit 34 of FIG. 1 can be a mud pump fluidically connected to the wellbore 16 by the supply line 38 to pump drilling mud slurry or a water based fluid such as a completion fluid, e.g., a completion brine, into the wellbore 16. Mixing equipment 44 may similarly be employed to blend or mix a dry mud blend with a fluid such as water or oil-based fluid. The pumping equipment 46 may be a piston pump. The drilling mud slurry or the completion brine may be referred to as a wellbore treatment.

In an alternate embodiment, for example, in the context of a completion operation, a pump unit similarly situated to the pump unit 34 of FIG. 1 can be a blender fluidically connected to one or more high pressure pumping units, also called frac pumps, that are fluidically connected to the wellbore 16 by the supply line 38 to pump a wellbore treatment, e.g., frac slurry, into the wellbore 16. Mixing equipment 44 may similarly be employed to blend or mix a proppant, e.g., sand, with a water mixture that includes one or more additives, e.g., a friction reducer or a gel, into the frac slurry. The pumping equipment 46 on the blender may be a centrifugal pump. The pumping equipment 46 on the frac pump may be a plunger pump. Although one pump unit 34 is illustrated in FIG. 1, it is understood that two or more pump units may be coupled to the wellbore 16 and communicatively coupled by the unit controller 48 to cooperatively pump a wellbore treatment into the wellbore 16. For example, a blender may be fluidically coupled to the wellhead 36 via a frac pump. The blender and the frac pump may be communicatively coupled by the unit controller 48.

Figures 2, 3:
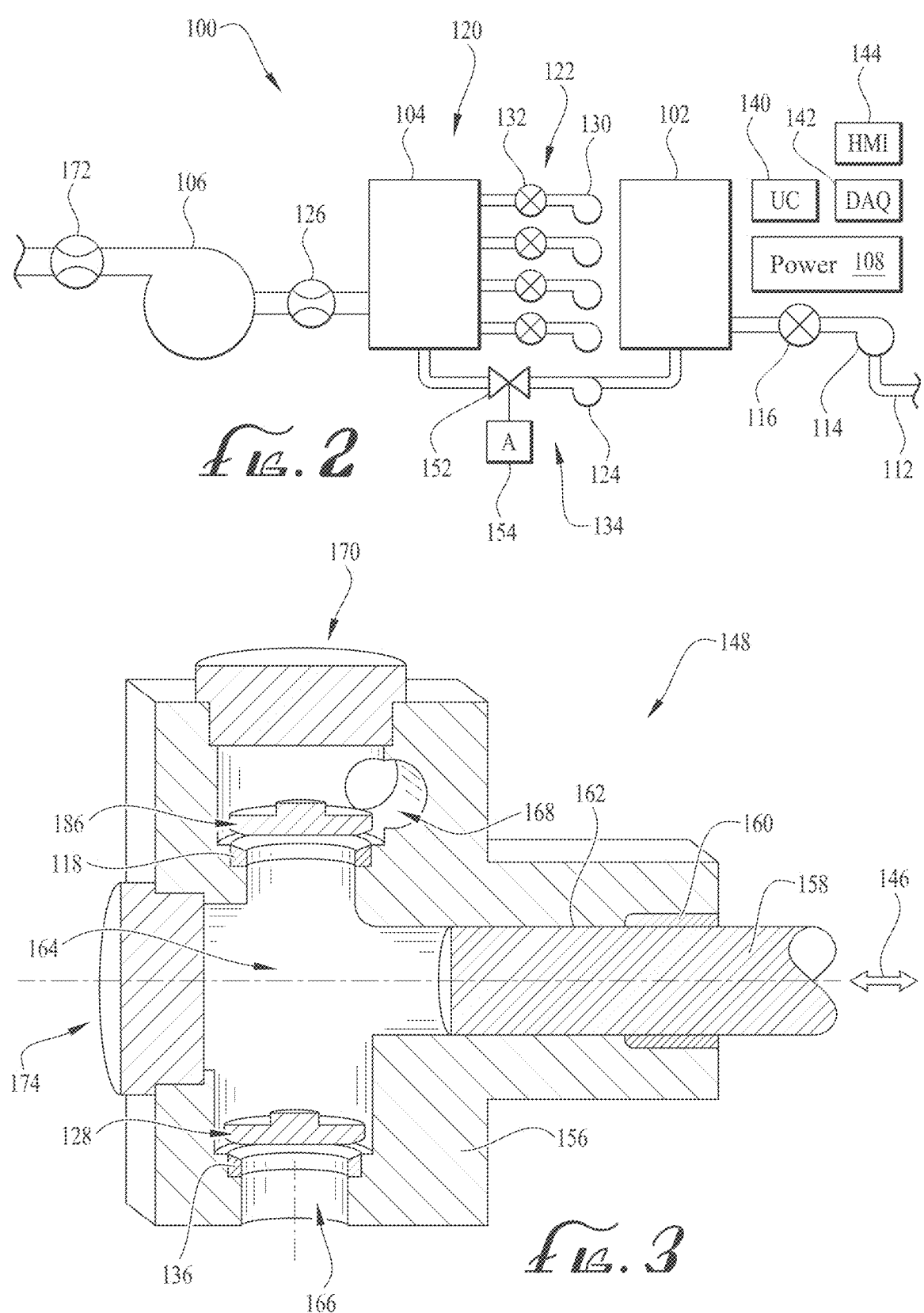
FIG. 2 is an illustration of a pump unit assembly according to an embodiment of the disclosure.
FIG. 3 is an illustration of a plunger pump according to an embodiment of the disclosure.

Referring to FIG. 2, one or more of the embodiments of the pump unit 34 is illustrated in further detail. In an embodiment, pump unit 100 comprises a supply tank 102, a mixing system 120, a main pump 106, and at least one power supply 108. The main pump 106 can be a centrifugal pump. The power supply 108 can include one or more electric-, gas-, or diesel-powered motors which are coupled to the supply tank 102, the mixing system 120, the main pump 106, and the various components such as feed pumps and valves. The power supply 108 may supply power to actuate the main pump 106. For example, the power supply 108 can be directly coupled by a drive shaft or indirectly coupled, such as via an electrical power supply, to the main pump 106. The supply tank 102 can provide water to the mixing system 120 via a water supply system. The mixing system 120 can blend a fluid composition of water, dry ingredients, e.g., cement, mud, or sand, and other additives for delivery to the wellbore 16 via the main pump 106.

The pump unit 100 may comprise a unit controller 140, a data acquisition system (DAQ) card 142, and a display 144. The unit controller 140 may comprise a computer system comprising one or more processors, memory, input devices, and/or output devices. The unit controller 140 may have one or more applications executing in memory. The unit controller 140 may be communicatively connected to the pumping equipment and mixing equipment of the pump unit 100. The DAQ card 142 may convert one or more analog and/or digital signals into signal data. In an embodiment, the DAQ card 142 may be communicatively connected to the unit controller 140. In an alternate embodiment, the DAQ card 142 may be a standalone system with a microprocessor, memory, and one or more applications executing in memory. In another alternate embodiment, the DAQ card 142 card may be combined with the unit controller 140 as a unitary assembly. For example, the DAQ card 142 may be combined with one of the input-output devices of the unit controller 140 when combined into a unitary assembly. The display 144, e.g., interactive display, may be a Human Machine Interface (HMI) that provides an input device and an output device for the unit controller 140. The display 144, e.g., HMI, may include a selectable input screen that includes icons and selectable key board or key pad inputs for the unit controller 140. The display 144 may display data and information about the status and operation of the pump unit 100. The information provided to the service personnel by the display 144 may include sensor data from the DAQ card 142.

The pump unit 100 may comprise a supply tank 102 that can store a volume of water or other liquid for use in the mixing system 120. The supply tank 102 can be connected to a water supply unit by a supply line 112, a supply pump 114, and a supply valve 116. The supply pump 114 can comprise a centrifugal pump, a piston pump, or a plunger pump. The supply valve 116 can comprise a flow control valve, e.g., a globe valve, a pinch valve, or a needle valve, that can be open, closed, or regulate the fluid flow within. The unit controller 140 may provide power, e.g., voltage and current, and communication to the supply valve 116 and the supply pump 114. The supply tank 102 may have one or more sensors, e.g., a tub level sensor, communicatively connected to the unit controller 140 via the DAQ card 142.

The mixing system 120 can include the mixing drum 104, one or more additive systems 122, and a liquid delivery system 134. The liquid delivery system can fluidically connect the supply tank 102 to the mixing drum 104. The one or more additive systems 122 may fluidically connect a volume of liquid additives, such as accelerators, retarders, extenders, fluid loss, and viscosity modifiers, to the mix drum 104. The additive systems 122 can comprise an additive pump 130, an additive valve 132, and flow meter. The additive pump 130 can be a diaphragm pump, a piston pump, or a centrifugal pump. The additive valve 132 can be an on-off valve such as a ball valve or plug valve. Each additive pump 130 can be communicatively coupled to a corresponding flow meter and to the unit controller 140 via the DAQ card 142. The unit controller 140 can dispense a predetermined volume of additive by controlling the additive pump 130 and additive valve 132 with feedback from the flow meter. The liquid delivery system 134 can supply a predetermined flowrate of liquid, e.g., water, to the mix drum 104. The unit controller 140 may change the volumetric rate of the liquid, e.g., water, with the supply pump 124 and the valve position of the flow control valve 152 in response to the data from one or more sensors, e.g., flow meter. The mixing system 120 can include a mixing valve 126 located downstream from the mixing drum 104. The mixing valve 126 can be a flow control valve or an isolation valve, e.g., a ball valve or plug valve.

The liquid delivery system 134 comprises a supply pump 124 and a flow control valve 152. The flow control valve 152 may be a globe valve, a pinch valve, a needle valve, a plug valve, or a slide valve. The supply pump 124 may be a centrifugal pump, a plunger pump, a screw pump, a piston pump, or combinations thereof. The unit controller 140 can direct the liquid delivery system 134 to pump water at a desired flowrate from the supply tank 102 to the mix drum 104 with various sensors providing feedback. In an embodiment, the liquid delivery system 134 can pump water from a supply line 112 connected to a water supply unit.

The main pump 106 may be configured according to the operation in which it will be employed. For example, the main pump 106 may be a centrifugal pump, a piston pump, or a plunger pump. For example, in the context of the cementing operation of FIG. 2, the main pump 106 can be a centrifugal pump. The centrifugal pump comprises a housing, an impeller, and a shaft seal. The slurry mixed within the mixing drum 104 can be transferred to the main pump 106 via the mixing valve 126. The main pump 106 may have a main valve 172 coupled to the outlet of the main pump 106. The main valve 172 may be a stand-alone valve or may be a portion of a discharge manifold. A discharge manifold may have one or more flow valves and one or more isolation valves. The main valve 172 can be a flow control valve or an isolation valve such as a plug valve or ball valve. The unit controller 140 may be communicatively coupled to the main pump 106 and the main valve 172. The unit controller 140 may control the operation of the main pump 106 to change the pump rate of the main pump 106 and the valve position of the main valve 172 in response to the data from one or more sensors, e.g., a flow meter.

Although the pump unit 100 of FIG. 2 is described as a cement pumping unit, it is understood that the pump unit 100 may be a mud pump, a blender, a frac pump, or a water supply. Each type or configuration of pump unit, e.g., a mud pump, a cement pump unit, a blender, a frac pump, or a water supply, may include a main pump, e.g., 106, a flow control valve, e.g., 150, and a unit controller, e.g., 140. The unit controller, e.g., 140, may receive data via a DAQ card 142. The unit controller 140 of the pump unit, e.g., 100, may be communicatively connected to one or more pump units, e.g., 100, at the wellsite. The pump unit, e.g., 100, may work in concert with at least one more pump unit, e.g., 100. In a scenario, the pump unit 100 may be controlled, via the unit controller 140, by a control system at the wellsite. The pump unit 100 may be communicatively connected to a control system at the wellsite.

In the context of a high pressure pump, also referred to as a fracturing pump, the main pump 106 may be a plunger pump. Turning now to FIG. 3, in an alternate embodiment, a plunger pump 148 is illustrated in further detail. The plunger pump 148 comprises a fluid end body 156, a plunger body 158, a suction valve 128, and a discharge valve 186. In operation, the reciprocating motion 146 of the plunger body 158 can draw a wellbore treatment fluid through the inlet port 166 of the fluid end body 156, into the fluid chamber 164 to be pressurized and expelled through the discharge port 168. The suction valve 128 can open to allow wellbore fluid into the fluid chamber 164 and seal against the insert 136 to pressurize the fluid. The discharge valve 186 can close to seal against the valve insert 118 to draw fluid into the fluid chamber 164 and open to allow the wellbore treatment fluid to exit the fluid chamber 164 and pass through the discharge port 168. A set of packing, e.g., elastomeric or thermoplastic seals, can provide a fluid seal on the outer surface 162 of the plunger body 158. The wellbore treatment fluid can be drawn into the fluid chamber 164 by a reciprocating motion 146 of the plunger body 158 in a first direction moving away from the fluid chamber 164. The wellbore treatment fluid can be pressurized and expelled from the fluid chamber 164 in response to a reciprocating motion 146 of the plunger body 158 moving towards the fluid chamber 164. The suction valves 128 and/or 186 and inserts 136 and/or 118 within the fluid chamber 164 can be accessed through end cover 174 and the top cover 170.

In an embodiment, a wellbore servicing method may comprise transporting the pump unit, e.g., the pump unit 34 of FIG. 1, to the wellsite environment 10. The pump unit 34 may be positioned at the wellsite and fluidically connected to the wellbore 16, for example, via a supply line 38 coupled to a wellhead 36. As previously described, the wellbore servicing operation may include more than one pump unit 34.

In some embodiments, the wellbore servicing method may include providing a wellbore treatment, via a pump unit, e.g., the pump unit 34, following a design pumping procedure for the placement of the wellbore treatment at a target location within the wellbore. The wellbore treatment placed in the performance of the design pumping procedure can include a treatment blend, e.g., cement blend, a liquid blend, e.g., water with additives, or combinations thereof and may be placed via one or more downhole tools. The liquid and/or treatment blend may be prepared within the pump unit, e.g., the pump unit 34, as a wellbore treatment, e.g., a cementitious slurry. The pump unit, e.g., the pump unit 34, can mix the treatment blend and the liquid blend within the mixing equipment, e.g., 44 of FIG. 1, to form a treatment slurry and pump the treatment slurry into the wellbore 16 with the pumping equipment 46 via the supply line 38. The pump unit 34 can deliver the treatment slurry into the wellbore 16 at a desired flowrate per the designed pumping procedure. Turning back to FIG. 2, the flowrate of the blended slurry from the pump unit 100 to the wellbore 16 can be controlled by the unit controller 140. The liquid delivery system 134 can transfer a liquid, e.g., water, from the supply tank 102 to the mixing drum 104 at a predetermined flowrate per the design pumping procedure to create the blended slurry within the mixing system 120 for delivery to the wellbore 16 via the main pump 106. The capacity of the liquid delivery system 134 and the main pump 106 to deliver wellbore treatment fluid at a desired or predetermined flowrate can depend on proper maintenance to of the pumping equipment of the pump unit 100 including the supply pump 114, the supply pump 124, the additive pumps 130, and the main pump 106.

In some embodiments, the pump unit 34 may monitor the pump usage of at least one pump, e.g., pumping equipment 46 of FIG. 1, to predict the usable pump life remaining before each pump, e.g., pumping equipment 46, requires maintenance. The unit controller 48 may load one or more processes, e.g., applications, into memory to track pump usage and predict a percentage of pump life remaining. The one or more processes may be applications that are loaded when the unit controller 48 is started or before a design pumping procedure begins. A managing process executing on the unit controller 48 may load a current pump dataset comprising a pump usage log and a pump maintenance log into a predictive maintenance model. The pump usage log and a pump maintenance log may also be referred to as a historical datasets. The pump usage log comprises pump usage values indicative of a wellbore pumping operation such as pump flowrate, pump pressure, fluid volume, or combinations thereof. The unit controller 48 can update the pump usage log with pump usage values comprising periodic sensor data indicative of the pumping operation. The pump maintenance log comprises at least one value indicative of a past maintenance event such as pump identification, repair performed, location, or date. The unit controller 48 may start a design pumping procedure comprising a sequential series of steps including the wellbore treatment fluid blend, the pump pressures, the pump flowrates, the fluid volumes, or combinations thereof to place a wellbore treatment into a wellbore. The managing process can determine a probability of a future maintenance event from a predictive maintenance model by using the design pumping procedure, the pump usage log, the pump maintenance log, or a combination thereof as inputs. The future maintenance event may include a decline in performance, an imminent equipment failure, a cataphoric equipment failure, or combinations thereof. The pump performance may decline as the accumulation of pump usage values approaches the usage threshold of the future maintenance event. The pump performance decline may include a deterioration of the pumping capabilities, e.g., decrease in pressure or flowrate capabilities, and/or a catastrophic failure. A future maintenance event may be resolved by preventative maintenance on the pump equipment including an adjustment, a replacement of a component, a major overhaul, or combinations thereof. The predictive maintenance model may provide a pump life value comprising the remaining pump usage values before the future maintenance event.

Figures 4A, 4B:
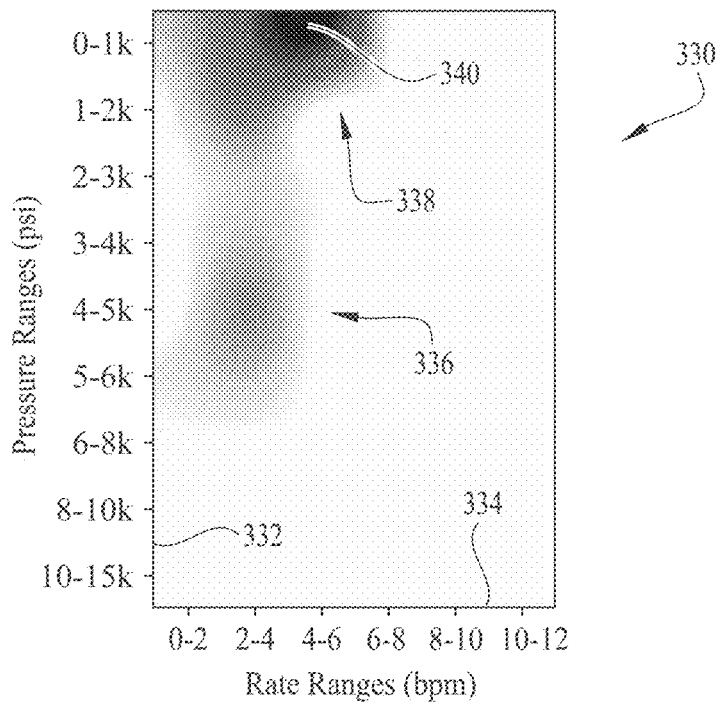
FIG. 4A is an illustration of a pump utilization table according to an embodiment of the disclosure.
FIG. 4B is an illustration of a pump utilization graph according to an embodiment of the disclosure.

The managing process executing on the unit controller 48 may track the pump usage values for at least one of the pumps, for example the main pump 148 in FIG. 3, by recording a set of sensor data indicative of pumping into a pump usage log. The unit controller 48 may display the pump usage log as a pump utilization table on display 144. Turning now to FIG. 4A, a pump utilization table 300 is described. In an embodiment, the unit controller 48 may display a pump utilization table 300 comprising a pressure bucket 302, a rate bucket 304, and a volume bucket 306. The unit controller 48 may record a pressure value from the pump, e.g., pumping equipment 46, into a pressure bucket 302 with the measurement units of pounds per square inch (psi) or other suitable pressure measurement units. The unit controller 48 may record a flowrate value into a rate bucket 304 with the measurement units of barrels per minute (bpm) or other flowrate measurement units. The unit controller 48 may record a volume value into a volume bucket 306 with the measurement units of barrels or other volume measurement units. The values recorded may be an actual value, an estimated value, or a value range. For example, the pressure bucket 302 may include a value range between at least 1000 psi but not exceeding 2000 psi. The rate bucket 304 may include a value range between at least 4 bpm but not exceeding 6 bpm. The volume bucket 306 may include an actual value of 36.2 bbls, an estimated value that is rounded up to the next integer of 37 bbls, or an estimated value that is rounded up to the next 10 s integer of 40 bbls. It is understood that the unit controller 140 may also track time as a separate bucket on the pump utilization table 300 or as a function of the combination of volume bucket 306 and the volumetric flowrate recorded in the rate bucket 304.

During pump operation, the unit controller 48 may record the pump usage values in a single entry until the pressure or flowrate exceeds a range value. For example, as shown in FIG. 4A, the unit controller 48 may record the pump usage values in a first entry 310A as long as the pump pressure is within the range of 0 to 1000 psi and the flowrate is within the range of 0 to 2 bpm. The unit controller 48 may record the volume pumped in the volume bucket 306 for the first entry 310A when the flowrate exceeds the value range in the rate bucket 304. The unit controller 48 may record a second entry 310B as long as the pump pressure and flowrate remain in the value range of the second entry 310B. The unit controller 48 may record the volume pumped in the volume bucket 306 for the second entry 310B when either the pressure or the flowrate is no longer within the value range of the second entry 310B. The unit controller 48 may continue recording the pump usage values in a third entry 310C, a fourth entry 310D, and continue until the end of the pumping operation, e.g., 310I. A blank entry 316 may indicate the end of the pump utilization table 300.

Turning now to FIG. 4B, the unit controller 48 may display a summary of the pump usage values from the pump utilization table 300 as a pump utilization graph 330. In some embodiments, the unit controller 48 may display a pump utilization graph 330 on display 144. A data visualization technique, also referred to as a heat map, can provide an indicia of the magnitude of data as a color or shading in two dimensions. The variation in color or shading may provide visual cues to the viewer about how the data is distributed over two dimensional space, e.g., data on two axes. In an example, the pump utilization graph 330 can include a first axis 334 with value ranges of flowrate, e.g., rate bucket 304, and a second axis 332 with value ranges of pressure, e.g., pressure bucket 302. The unit controller 140 may utilize a spatial heat map to display the pump usage data distributed about a first region 336, a second region 338, and a third region 340. The first region 336 may represent a three pressure value ranges with a one flowrate value range. The majority of the first region can be approximated at a pressure range of 4-5K psi and a flowrate range of 2-4 bpm. The second region 338 can represent two pressure value ranges with three flowrate value ranges. A third region 340 can be found within the second region 338. The majority of the third region can be approximated at a pressure range of 0-1k psi and a flowrate range of 4-6 bpm.

The predictive maintenance model may access a pump maintenance log in memory. The pump maintenance log comprises a maintenance record of each pump within the pump unit 100. For example, in FIG. 2, pump maintenance log for the pump unit 100 may include individual pump maintenance records for the main pump 106, the supply pump 124, the supply pump 114, and each of the additive pumps 130. The pump maintenance records comprise past maintenance events.

A machine learning process may use the pump usage values as inputs into a predictive maintenance model to determine a pump usage threshold. The unit controller 140 may input the pump maintenance log, the pump usage values, and the accumulation of pump usage, e.g., pump utilization table 300, into a predictive maintenance model to determine the probability of a future maintenance event. The predictive maintenance model may predict a probability of a future maintenance event with a pump usage threshold and determine a pump life value comprising the pump usage value remaining before the pump usage threshold. The pump life value can be displayed as an indicia of the remaining pump usage before the future maintenance event. The pump life value can include the pump usage threshold compared to the current pump usage, e.g., pump utilization table 300. The pump life value can be expressed as a portion or a percentage of pump usage values before the pump usage threshold of the future maintenance event.

In some embodiments, the unit controller 140 may alert the service personnel of one or more approaching future maintenance events. The unit controller 140 may display an indicia of the pump usage value and/or the pump life value exceeding one or more threshold values comprising a recommended maintenance period, a required maintenance period, or combinations thereof. The recommended maintenance period includes a pump usage value threshold indicative of at least one pumping operation before the future maintenance event. The pump usage value threshold comprises an estimated pump usage for at least one pumping operation so that the pump maintenance may be completed before the threshold value is exceeded. The required maintenance period includes a pump usage value threshold indicative of the future maintenance event. The probability of the future maintenance event, the pump usage value, the pump life value, the one or more threshold values, or combinations thereof may comprise a fitness indicator.

In an example, the unit controller 140 may provide an indicia via the display 144 of a pump usage values, e.g., fluid volume, compared to a pump usage value threshold for a future maintenance event. The output of the indicia of the fitness indicator may include the pump life value, the pump usage values, or combination thereof beginning at a period of at least one estimated pumping operations before a recommended maintenance period. In another scenario, the unit controller 140 may provide an indicia of a pump usage values within the recommended maintenance period. The indicia via the display 144 may include a first pump usage value exceeding the pump usage threshold for the recommended maintenance period and a second pump usage value approaching the future maintenance event. In a third scenario, the unit controller 140 may provide an indicia of a pump usage values exceeding the pump usage threshold for the future maintenance event. The indicia via the display 144 of the pump usage values and the pump usage thresholds comprise a visual cue, audible cue, or a combination thereof.

The unit controller 140 may recommend a lower pump rate based on the pump life value. In some embodiments, the unit controller 140 may input a second pump rate that is lower than the designed pump rate, into the predictive maintenance model. The unit controller 140 may access the design pumping procedure to retrieve a first pump rate, e.g., the designed pump rate, and input a second pump rate that is a portion of, e.g., 75 percent, the first pump rate into the predictive maintenance model. The predictive maintenance model may recommend the second pump rate in response to a second future probability being lower than the first future probability of a future maintenance event.

In some embodiments, the unit controller 140 may adjust a pump rate, e.g., a flowrate, after the pump usage values exceeds the pump usage threshold for the future maintenance event. In some embodiments, the unit controller 140 may automatically slow the pump rate in response to the pump usage values exceeding the threshold for recommended maintenance period or the threshold for required maintenance period.

The previously described method for determining the probability of a future maintenance event comprises a predictive maintenance model. In some embodiments, the predictive maintenance model may be developed with a machine learning process that utilizes training data gener-ated from historical database of completed pumping operations. The historical pumping data may include the design pumping procedure, the pump usage log, the pump maintenance log, or combinations thereof. The machine learning process of the predictive maintenance model may be trained to determine the probability based on the pump usage log corresponding to the pump maintenance logs stored within the historical database.

A method for training a predictive maintenance model to determine the probability of a future maintenance event is described. In some embodiments, a predictive maintenance model may comprise a machine learning process executing on a computer system. The machine learning process may retrieve a completed pumping record from a historical database of completed pumping operations. The completed pumping record includes historical datasets comprising a pump usage log, a pump maintenance log, an environmental log, a design pumping procedure, or combinations thereof. The historical datasets may comprise a current pump data-set.

In some embodiments, the machine learning process may utilize a machine learning classifier to identify a plurality of pump usage values within the pump usage log correlated to sequential steps within the design pumping procedure. The machine learning classifier may include a supervised or semi-supervised classifier utilizing a training set. For example, the machine learning classifier may compare the pump usage values within the pump usage log to a training set of data within a training pump usage log to identify the inputs for the machine learning process. The pump usage log may correlate to a designed pump usage within a design pumping procedure. The designed pump usage may include the pump pressures, pump rates, and fluid volume of each step or stage.

In some embodiments, the machine learning process may utilize a machine learning classifier to identify a past maintenance event within the pump maintenance log. The machine learning classifier may include a supervised or semi-supervised classifier utilizing a training set. For example, the machine learning classifier may compare the data, e.g., past maintenance event, within the pump maintenance log to a training set of data within a training maintenance log to identify the inputs for the machine learning process. The past maintenance event may comprise a timestamp, a component record, an identifier, a service center 238, a functional designation, or combinations thereof. The timestamp comprises a year, a month, a day, an hour, a minute, or combinations thereof. The identifier comprises a unique indicia identifying the pump, e.g., the main pump 106, and the pump unit, e.g., 100. The component record may comprise the identity of a component that was adjusted, modified, or replaced within the pump, e.g., packing seal 160 on FIG. 3. The past maintenance event may include the location of the maintenance event, e.g., a service location. The functional designation may include a description of the service. For example, the past maintenance event may include a service date, a service location, an identifier, e.g., main pump 148 of FIG. 3, a component, e.g., suction valve 128, and a functional designation, e.g., replace intake valve. The pump maintenance log may include a single pump, i.e., the main pump 106, a plurality of pumps, i.e., additive pumps 130, or all of the pumping equipment included on the pump unit 100.

In some embodiments, the machine learning process may utilize a machine learning classifier to identify a wellsite environmental record within the environmental log. The environmental log may comprise a wellbore pump unit identification, a service center 238, a wellsite environmental record corresponding to the pump usage log, or combinations thereof. The machine learning classifier may include a supervised or semi-supervised classifier utilizing a training set. For example, the machine learning classifier may compare the data within the environmental log to a training set of data within a training wellsite environmental records within a training environmental log to identify the inputs for the machine learning process. The wellsite environmental record may comprise the environmental conditions the pump unit experiences during a pumping operation including an ambient temperature, a wellbore treatment fluid temperature, the operational temperature of the pumping equipment, or combinations thereof. The environmental record may also include vibration measurements of the road conditions, a geographical location of the wellsite, and a distance from the service center location to the wellsite, or combinations thereof. The geographical location of the wellsite may be determined by a mobile carrier network as will be disclosed hereafter.

In some embodiments, the inputs from the machine learning classifier may train the predictive maintenance model to determine the probability of a future maintenance event. For example, the model may utilize the inputs received from the machine learning classifier, e.g., the pump usage log and the pump maintenance log, to predict a future maintenance event, e.g., a pump failure. The predictive maintenance model may group a plurality of pump usage logs with similar pump usage values, e.g., high pressure output, to compare with the corresponding past maintenance events to determine a probability value for a future maintenance event. The predictive maintenance model may apply a weight value to the predictions based on the pump maintenance log. For example, the model may apply a large weight value based on the service center location. In another scenario, the model may apply a weight value based on the functional designation within the past maintenance event. In some embodiments, the predictive maintenance model may apply a negative weight value for the environmental conditions, e.g., ambient temperature, within the wellsite environmental record. In some embodiments, the predictive maintenance model may apply a negative weight value for the wellsite conditions, such as the vibration measurements of the road conditions and/or distance to the wellsite, within the wellsite environmental record. The predictive maintenance model may output a probability of a future maintenance event and corresponding pump usage value before the probability of a future maintenance event increases to 100 percent.

In some embodiments, the machine learning process may validate the predictive maintenance model by comparing the probability to one or more known results. For example, the machine learning process may input at least one completed wellbore pumping record with a known future maintenance event into the predictive maintenance model. The machine learning process may determine an error value by comparing the results of the predictive maintenance model to the known future maintenance event. The error value may be determined from the pump usage value, the pump life value, the pump usage threshold for the future maintenance event, or combination thereof. The known future maintenance event may include a past maintenance event within the pump maintenance log corresponding to the pumping unit, e.g., 100, of the completed wellbore pumping record.

In some embodiments, the machine learning process may train the predictive maintenance model to reduce the error value. For example, the machine learning process may determine a first error value, modify the predictive maintenance model, and determine a second error value that is less than the first error value.

The unit control may be a computer system suitable for communication and control of the pumping unit. In FIG. 1, the unit controller 48 may establish control of the operation of the mixing equipment 44 and the pumping equipment 46 of the pump unit 34. In FIG. 2, the unit controller 140 may establish control of the operation of the mixing system 120 and the main pump 106 of the pump unit 100. In an embodiment, the unit controller 48 and/or 140 may be an example of computer system 176 described in FIG. 5. Turning now to FIG. 5, a computer system 176 suitable for implementing one or more embodiments of the unit controller, for example 48 and/or 140, including without limitation any aspect of the computing system associated with pump unit 34 of FIG. 1 and pump unit 100 of FIG. 2 and any aspect of a unit control as shown as unit controller 48 in FIG. 1 and unit controller 140 in FIG. 2. The computer system 176 includes one or more processors 178 (which may be referred to as a central processor unit or CPU) that is in communication with memory 180, secondary storage 182, input-output devices 184, DAQ card 192, and network devices 188. The computer system 176 may continuously monitor the state of the input devices and change the state of the output devices based on a plurality of programmed instructions. The programming instructions may comprise one or more applications retrieved from memory 180 for executing by the processor 178 in non-transitory memory within memory 180. The input-output devices may comprise a HMI, e.g., display 144 in FIG. 2, with a display screen and the ability to receive conventional inputs from the service personnel such as push button, touch screen, keyboard, mouse, or any other such device or element that a service personnel may utilize to input a command to the computer system 176. The secondary storage 182 may comprise a solid state memory, a hard drive, or any other type of memory suitable for data storage. The secondary storage 182 may comprise removable memory storage devices such as solid state memory or removable memory media such as magnetic media and optical media, i.e., CD disks. The computer system 176 can communicate with various networks with the network devices 188 comprising wired networks, e.g., Ethernet or fiber optic communication, and short range wireless networks such as Wi-Fi (i.e., IEEE 802.11), Bluetooth, or other low power wireless signals such as ZigBee, Z-Wave, 6LoWPan, Thread, and WiFi-ah. The computer system 176 may include a long range radio transceiver 190 for communicating with mobile network providers as will be disclosed further herein.

The computer system 176 may comprise a DAQ card 192 for communication with one or more sensors. The DAQ card 192 may be a standalone system with a microprocessor, memory, and one or more applications executing in memory. The DAQ card 192, as illustrated, may be a card or a device within the computer system 176. In an embodiment, the DAQ card 192 may be combined with the input-output device 184. The DAQ card 192 may receive one or more analog inputs, one or more frequency inputs, and one or more Modbus inputs. For example, the analog input may include a tub level sensor. For example, the frequency input may include a flow meter. For example, the Modbus input may include a pressure transducer.

Data can be transmitted and received by various wired or wireless means between a service center and the pump unit 100 at a remote wellsite location for further processing. Turning now to FIG. 5, a data communication system 200 is described. The data communication system 200 comprises a wellsite 202 (where the pump unit 34 of FIG. 1 can be located), an access node 210 (e.g., cellular site), a mobile carrier network 254, a network 234, a storage computer 236, a service center 238, and a plurality of user devices 252. A wellsite 202 can include a pump unit 204 as part of a well construction operation pumping a service fluid into the wellhead 208 (e.g., 36 in FIG. 1). The pump unit 204 can include a communication device 206 (e.g., transceiver 190 of FIG. 5) that can transmit and receive via any suitable communication means (wired or wireless), for example, wirelessly connect to an access node 210 to transmit data (e.g., pump usage log) to a storage computer 236. The storage computer 236 may also be referred to as a data server, data storage server, or remote server. The storage computer 236 may include a historical database of completed pumping operations. Wireless communication can include various types of radio communication, including cellular, satellite 230, or any other form of long range radio communication. The communication device 206 can transmit data via wired connection for a portion or the entire way to the storage computer 236. The communication device 206 may communicate over a combination of wireless and wired communication. For example, communication device 206 may wirelessly connect to access node 210 that is communicatively connected to a network 234 via a mobile carrier network 254.

In an embodiment, the communication device 206 on the pump unit 204 is communicatively connected to the mobile carrier network 254 that comprises the access node 210, a 5G edge site 212, a 5G core network 220, and the network 234. The communication device 206 may be the transceiver 190 connected to the computer system 176 of FIG. 4. The computer system 176 may be the unit controller 140 of FIG. 2 or unit controller 48 of FIG. 1, thus the communication device 206 may be communicatively connected to the unit controller 140 and/or 48.

The access node 210 may also be referred to as a cellular site, cell tower, cell site, or, with 5G technology, a gigabit Node B. The access node 210 provides wireless communication links to the communication device 206, e.g., Unit controller 140 and/or 48, according to a 5G, a long term evolution (LTE), a code division multiple access (CDMA), or a global system for mobile communications (GSM) wireless telecommunication protocol.

The communication device 206 may establish a wireless link with the mobile carrier network 254 (e.g., 5G core network 220) with a long-range radio transceiver, e.g., 190 of FIG. 4, to receive data, communications, and, in some cases, voice and/or video communications. The communication device 206 may also include a display and an input device (e.g., display 144 or HMI), a camera (e.g., video, photograph, etc.), a speaker for audio, or a microphone for audio input by a user. The long-range radio transceiver, e.g., 190, of the communication device 206 may be able to establish wireless communication with the access node 210 based on a 5G, LTE, CDMA, or GSM telecommunications protocol. The communication device 206 may be able to support two or more different wireless telecommunication protocols and, accordingly, may be referred to in some contexts as a multi-protocol device. The communication device 206, e.g., 206A, may communicate with another communication device, e.g., 206B, on a second pump truck, e.g., 204B, via the wireless link provided by the access node 210 and via wired links provided by the mobile carrier network 254, e.g., 5G edge site 212 or the 5G core network 220. Although the pump unit 204 and the communication device 206 are illustrated as a single device, the pump unit 204 may be part of a system of pump units, e.g., a frac fleet. For example, a pump unit 204A may communicate with pump units 204B, 204C, 204D, 204E, and 204F at the same wellsite, e.g., 202 of FIG. 6, or at multiple wellsites. In an embodiment, the pump units 204A-E may be a different types of pump units at the same wellsite or at multiple wellsites. For example, the pump unit 204A may be a frac pump, pump unit 204B may be a blender, pump unit 204C may be water supply unit, pump unit 204D may be a cementing unit, and pump unit 204E may be a mud pump. The pump unit 204A-F may be communicatively coupled together at the same wellsite by one or more communication methods. The pump units 204A-F may be communicatively couple with a combination of wired and wireless communication methods. For example, a first group of pump units 204A-C may be communicatively coupled with wired communication, e.g., Ethernet. A second group of pump units 204D-E may be communicatively couple to the first group of pump units 204A-C with low powered wireless communication, e.g., WIFI. A third group of pump units 204F may be communicatively coupled to one or more of the first group or second group of pump units by a long range radio communication method, e.g., mobile communication network.

The 5G edge site 212 can be communicatively coupled to the access node 121. The 5G edge site 212 may also be referred to as a regional data center (RDC) and can include a virtual network in the form of a cloud computing platform. The cloud computing platform can create a virtual network environment from standard hardware such as servers, switches, and storage. The total volume of computing availability 214 of the 5G edge site 212 is illustrated by a pie chart with a portion illustrated as a network slice 218 and the remaining computing availability 216. The network slice 218 represents the computing volume available for storage or for processing of data. The network slice 218 may be referred to as a network location. The cloud computing environment is described in more detail, further hereinafter. Although the 5G edge site 212 is shown communicatively coupled to the access node 210, it is understood that the 5G edge site 212 may be communicatively coupled to a plurality of access nodes (e.g., 210). The 5G edge site 212 may receive all or a portion of the voice and data communications from one or more access nodes (e.g., 210). The 5G edge site 212 may process all or a portion of the voice and data communications or may pass all or a portion to the 5G core network 220 as will be described further hereinafter. Although the virtual network is described as created from a cloud computing network, it is understood that the virtual network can be formed from a network function virtualization (NFV). The NFV can create a virtual network environment from standard hardware such as servers, switches, and storage. The NFV is more fully described by ETSI GS NFV 002 v1.2.1 (2014-12).

In some embodiments, a network location comprises a computational capacity communicatively coupled to a network. The network location can comprise a storage device, a computer system, a virtual computer environment, a virtual network function, or combination thereof communicatively connected to at least one network, e.g., 220. For example, a network location can be a user device such as user device 252 of FIG. 6, e.g., a computer system, communicatively connected to a network 234. In another example, a network location can be a storage computer 236 communicatively connected to a network 234. The computational capacity of the network location can be defined by the type of computer system utilized. For example, a VNF on a network slice 226 may have a greater computational capacity than a user device 252. In a context, the network location includes an application, a database, or combinations thereof. For example, a network location may include an application for post-processing data. In another scenario, a network location comprises one or more applications executing on a network slice 226 within a 5G core network 220. It is understood that a network location may be communicatively connected to via more than one network, such as network 234 and 5G core network 220.

The 5G core network 220 can be communicatively coupled to the 5G edge site 212 and provide a mobile communication network via the 5G edge site 212 and one or more access node 210. Although the access node 210 is illustrated as communicatively connected to the 5G edge site 212, it is understood that one or more access nodes, e.g., 210, may be communicatively connected to the 5G core network 220. The 5G core network 220 can include a virtual network in the form of a cloud computing platform. The cloud computing platform can create a virtual network environment from standard hardware such as servers, switches, and storage. The total volume of computing availability 222 of the 5G core network 220 is illustrated by a pie chart with a portion illustrated as a network slice 226 and the remaining computing availability 224. The network slice 226 may be referred to as a network location. The network slice 226 represents the computing volume available for storage or processing of data. The cloud computing environment is described in more detail further hereinafter. Although the 5G core network 220 is shown communicatively coupled to the 5G edge site 212, it is understood that the 5G core network 220 may be communicatively coupled to a plurality of access nodes (e.g., 210) in addition to one or more 5G edge sites (e.g., 212). The 5G core network 220 may be communicatively coupled to one or more Mini Data Centers (MDC). MDC may be generally described as a smaller version or self-contained 5G edge site comprising an access node, e.g., 210, with a cloud computing platform, e.g., a virtual network environment, created from standard computer system hardware, e.g., processors, switches, and storage. The 5G core network 220 may receive all or a portion of the voice and data communications via 5G edge site 212, one or more MDC nodes, and one or more access nodes (e.g., 122). The 5G core network 220 may process all or a portion of the voice and data communications as will be described further hereinafter. Although the virtual network is described as created from a cloud computing network, it is understood that the virtual network can be formed from a network function virtualization (NFV). The NFV can create a virtual network environment from standard hardware such as servers, switches, and storage.

A storage computer 236 can be communicatively coupled to the 5G network, e.g., mobile carrier network 254, via the network 234. The storage computer 236 can be a computer, a server, or any other type of storage device. The storage computer 236 may be referred to as a network location. The network 234 can be one or more public networks, one or more private networks, or a combination thereof. A portion of the Internet can be included in the network 234.

Figure 6:
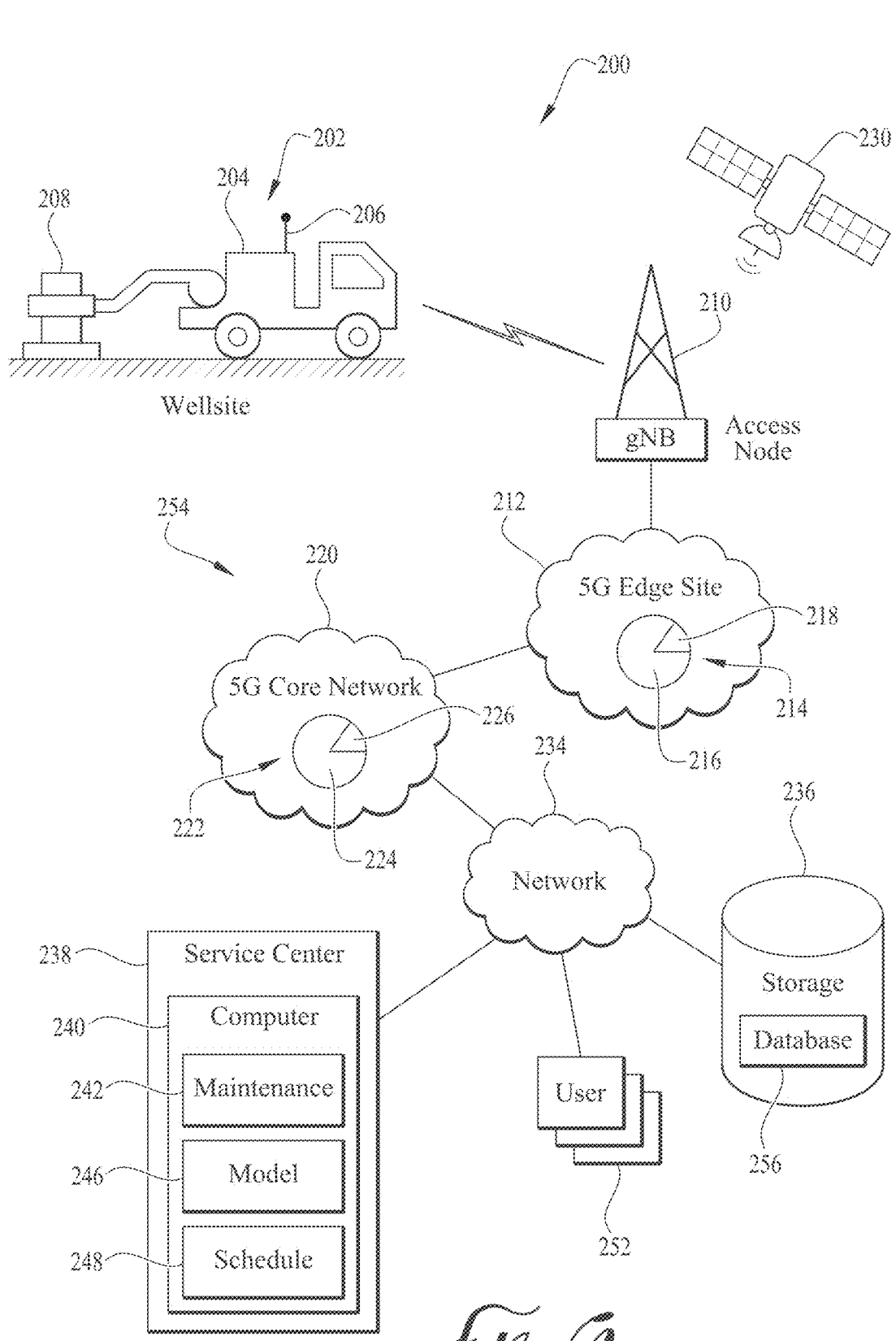
FIG. 6 is an illustration of a communication system according to an embodiment of the disclosure.
Figure 7:
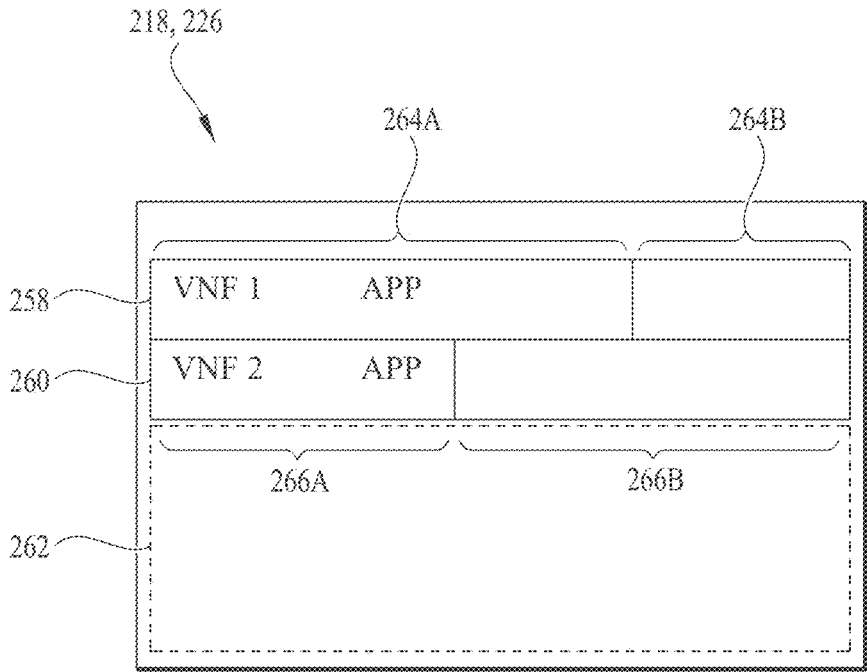
FIG. 7 is a block diagram of an application within a virtual network function on a network slice according to an embodiment of the disclosure.

Continuing on FIG. 6, a service center 238 may be a base of operations and provide maintenance for the pump unit 204. The maintenance for the pump unit 204 can include repair, replacement, modification, upgrades, or a combination thereof of the equipment on the pump unit 204 including, referring back to FIG. 2, the unit controller 140, the DAQ card 142, the display 144, i.e., HMI, the power supply 108, the supply tank 102, the mixing system 120, the additive system 122, the main pump 106, the supply pump 124, the supply pump 114, the plurality of additive pumps, e.g., 130, the plurality of valves, e.g., 152, the plurality of sensors, or combinations thereof. For example, the service center 238 may provide maintenance for the supply pump 124 including repair, replacement, modification, or an upgrade. In a scenario, the service center 238 may replace one or more seals within the supply pump 124. The replacement of the seals with the supply pump 124 may be past maintenance event generated in the pump maintenance log.

The service center 238 may have a maintenance application 242 for the pump unit, e.g., 204, executing on a central computer 240. The maintenance application 242 may assign a pump unit, e.g., 204, for maintenance to one or more components on the pump unit, e.g., main pump 106, by assigning the pump unit, e.g., 204, on the maintenance schedule 248. The assignment of the pump unit, e.g., 204, to the maintenance schedule 248 may be for repair, replacement, or modification of one or more components. In an embodiment, the maintenance application 242 may receive notification of a future maintenance event from the unit controller, e.g., 48, of the pump unit 204. In an embodiment, the maintenance application 242 may retrieve a completed pumping record from a historical database of completed pumping operations. The completed pumping record of the pump unit 204 may include a notification of a future maintenance event. For example, the pump unit 204 may transmit a completed pumping record at the end of the pumping operation to a historical database on the storage computer 236. The maintenance application 242 may retrieve the future maintenance event from the completed pumping record. The maintenance application 242 may alert one or more user devices 252 communicatively connected to the maintenance application 242 via the network 234. The maintenance application 242 may assign the pump unit 204 onto the maintenance schedule 248 for repair, replacement, or modification of the pumping equipment that a future maintenance event would occur according to the model. In an embodiment, the completed pumping record may be transmitted from the communication device 206 of the pump unit 204 to the storage computer 236 via the mobile carrier network 254. In an embodiment, the completed pumping record may be transmitted from the communication device 206 of the pump unit 204 to the maintenance application 242 executing on the central computer 240 via the mobile carrier network 254. In an embodiment, the maintenance application 242 may include a historical database 256 of completed pumping records. In an embodiment, the central computer 240 may include a historical database of completed pumping record.

In some embodiments, the service center 238 may have a predictive maintenance model 246 executing on a central computer 240. The service center 238 may retrieve a pump usage log, pump maintenance log, an environmental log, or combination thereof from a pump unit 204 or from a historical database 256. As previously described, the predictive maintenance model 246 may predict a future maintenance event for at least one pump equipment assembly on the pump unit 204. The machine learning process may train the predictive maintenance model 246 with the data on the historical database 256.

In some embodiments, the managing process may determine the location of the pump unit, e.g., 204 in FIG. 6. The managing process may connect the communication device 206 to the mobile carrier network 254. Said another way, the system performance application may connect the long range radio transceiver 190 of the computer system 176, shown in FIG. 5, to a mobile carrier network 254 via an access node 210 to establish a geographical location of the pump unit. The mobile carrier network 254 may provide the geographical location based on a triangulated signal or a digital map of the service area. The managing process may write the geographic location of the unit controller 140 and pump unit, e.g., 204, to the environmental log.

Although the maintenance application 242 is described as executing on a central computer 240, it is understood that the central computer 240 can be a computer system or any form of a computer system such as a server, a workstation, a desktop computer, a laptop computer, a tablet computer, a smartphone, or any other type of computing device. The central computer 240 (e.g., computer system) can include one or more processors, memory, input devices, and output devices, as described in more detail further hereinafter. Although the service center 238 is described as having the maintenance application 242 executing on a central computer 240, it is understood that the service center 238 can have 2, 3, 4, or any number of central computers 240 (e.g., computer systems) with 2, 3, 4, or any number of maintenance applications 242 executing on the central computers 240.

In an aspect, the mobile carrier network 254 includes a 5G core network 220 and a 5G edge site 212 with virtual servers in a cloud computing environment. One or more servers of the type disclosed herein, for example, storage computer 236 and central computer 240, can be provided by a virtual network function (VNF) executing within the 5G core network. The pump unit 204 on the wellsite 202 can be communicatively coupled to the 5G edge site 212, which includes the 5G core network 220 via the access node 210 (e.g., gigabit Node B) and thus can be communicatively coupled to one or more VNFs with virtual servers as will be more fully described hereinafter. Turning now to FIG. 6, a representative example of a network slice 218 and/or 226 is described. A computing service executing on network slice 218 and/or 226 can comprise a first virtual network function (VNF) 258, a second VNF 260, and an unallocated portion 262. The computing service can comprise a first application 264A executing on a first VNF 258 and a second application 266A executing on a second VNF 260. The first application 264A and second application 266A can be computing service applications generally referred to as remote applications. The total computing volume can comprise a first VNF 258, a second VNF 260, and an unallocated portion 262. The unallocated portion 262 can represent computing volume reserved for future use. The first VNF 258 can include a first application 264A and additionally allocated computing volume 264B. The second VNF 260 can include a second application 266A and additionally allocated computing volume 266B. Although two VNFs are illustrated, the network slice 218 and/or 226 can have a single VNF, two VNFs, or any number of VNFs. Although the first VNF 258 and second VNF 260 are illustrated with equal computing volumes, it is understood that the computing volumes can be non-equal and can vary depending on the computing volume needs of each application. The first application 264A executing in the first VNF 258 can be configured to communicate with or share data with the second application 266A executing in the second VNF 260. The first application 264A and second application 266A can be independent and not share data or communicate with each other. Although the network slice 218 and/or 226 is illustrated with two VNFs and an unallocated portion 262, the network slice 218 and/or 226 may be configured without an unallocated portion 262.

Although only one application, a first application 264A, is described executing within the first VNF 258, two or more applications can be executing within the first VNF 258 and second VNF 260. In an embodiment, the network slice 218 and/or 226 may be the network slice 218 on the 5G edge site 212. In an embodiment, the network slice 226 may be the network slice 226 on the 5G core network 220. In an embodiment, the first application 264A and/or the second application 266A executing on the first VNF 258 and/or second VNF 260 may be the model, the maintenance application 242, the maintenance model 246, the maintenance schedule 248, the storage computer 236, the historical database of completed pumping records, or combination thereof.

In some embodiments, a distributed computing system comprises the unit controller 140, at least one network location, or a combination thereof, communicatively connected. The distributed computing system can include two or more computer systems comprising a processor and non-transitory memory sharing a common goal and communicatively connected via a network, e.g., 5G Core Network 220. The common goal of the distributed computing system can include one or more processes that originate from a first computer system, also referred to as a managing computer system. The common goal of the distributed computing system may be distributed from the managing computer system to the network locations via messaging, for example filesharing, document sharing, email, text messaging, or combinations thereof. For example, the unit controller 140 may communicatively connect via mobile carrier network 254 and may transmit the pump usage values to the predictive maintenance model in one or more network locations, e.g., the model executing on the network slice 226. The network location can determine the future maintenance event and the corresponding pump usage threshold and transmit the results to the unit controller 140. The unit controller 140 can be a managing computer system to distribute, share, or send/receive the processes to one or more network locations. In a context, the distributed computing system can comprise the unit controller 140 and two or more network locations. In a scenario, the unit controller 140 may communicatively connect and transmit at least two sets of pump usage values to at least two predictive maintenance models at least one network locations, e.g., network slice 218, for concurrent processing of at least two future maintenance events. The network locations can each receive one or more pump usage values and complete the post-processing and transmit the one or more post-processing results to the unit controller 140. In a context, the distributed computing system comprises the unit controller 140. In a second scenario where the unit controller 140 fails to communicatively connect to the network, e.g., 254, the unit controller 140 can complete the processing without a network location. In this scenario, the unit controller 140 can complete the processing of a shared process when the connection with a network location is lost. For example, if the unit controller 140 fails to maintain or to be longer communicatively connected to a network location, the unit controller 140 can complete a process started by the network location.

Figure 8A:
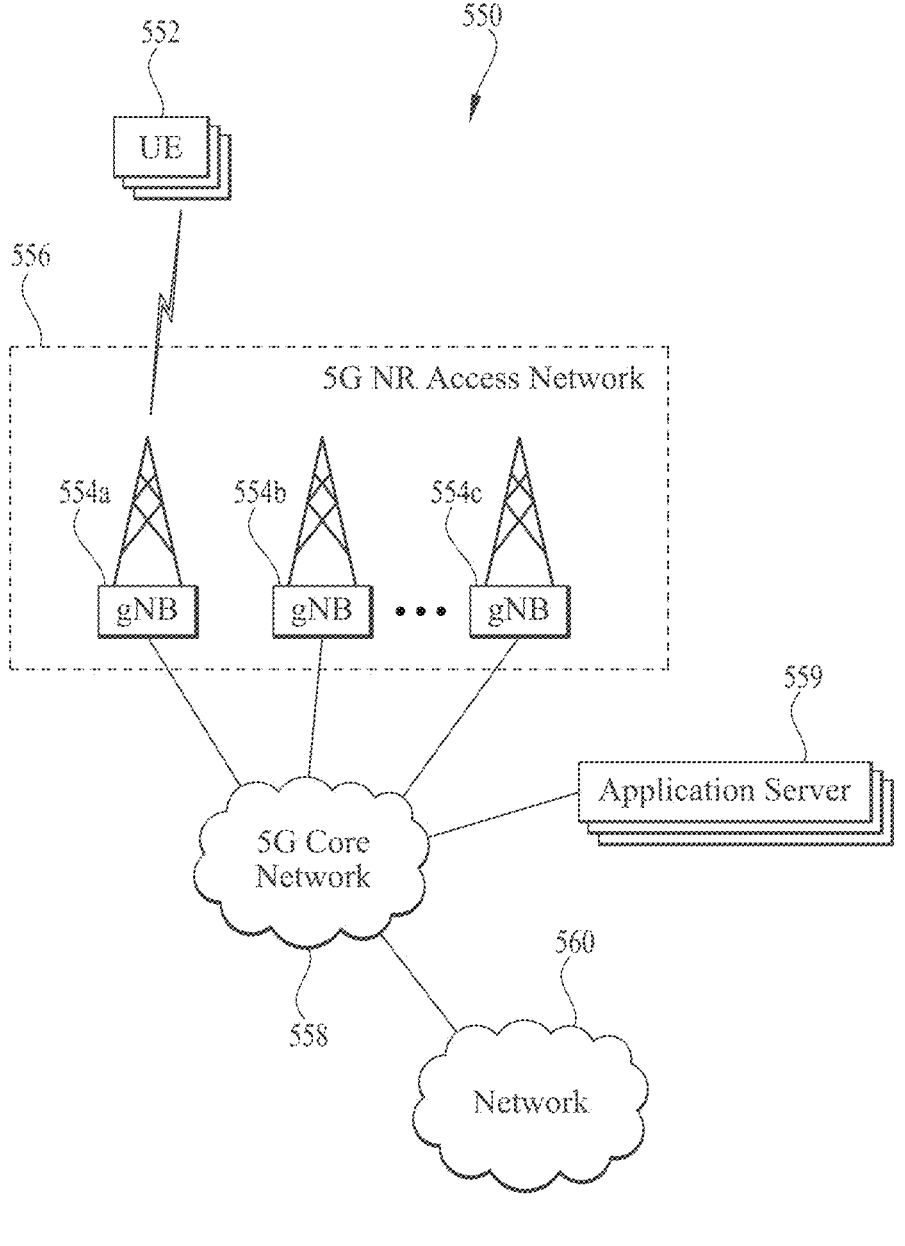
FIG. 8A is a block diagram of an exemplary communication system according to an embodiment of the disclosure.

Turning now to FIG. 8A, an exemplary communication system 550 is described suitable for implementing one or more embodiments disclosed herein, for example implementing communications or messaging as disclosed herein including without limitation any aspect of wireless communication between communication device 206 and mobile carrier network 254 on FIG. 5; any aspect of communications with the computing components and network associated with FIG. 4 (e.g., long range radio transceiver 190); etc. Typically, the communication system 550 includes a number of access nodes 554 that are configured to provide coverage in which UEs 552 such as cell phones, tablet computers, machine-type-communication devices, unit controllers, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an enhanced Node B (eNB). In 3G technology (e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Turning now to FIG. 8B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access node 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

The systems and methods disclosed herein may be advantageously employed in the context of wellbore servicing operations, particularly, in relation to the usage of wellbore servicing equipment as disclosed herein.

In an embodiment, the machine learning process disclosed herein may predict future equipment failures or needed maintenance that decreases the operability of the pumping equipment. The predictive maintenance model 246 disclosed herein, can predict a future maintenance event based on pump usage values, a pump maintenance log, and a pump usage log. The unit controller of the pumping unit can display an alert with a pump usage value in comparison to a threshold value of a recommended maintenance period before the future maintenance event.

Additionally or alternatively, the machine learning process can train the predictive maintenance model 246 with completed pumping records from a historical database 256. The machine learning process disclosed herein, can determine an error value by comparing a probability of future maintenance event determined by the predictive maintenance model from a completed pumping record from a historical database 256 wherein the future maintenance event is a known past maintenance event. The machine learning process can train the predictive maintenance model to reduce the error value. The machine learning process can improve the predictive maintenance model with the historical database and thereby improve the operative ability of the pumping equipment.

Additionally or alternatively, the predictive maintenance model 246 can recommend a lower pump rate during a pumping operation to delay a future maintenance event.

Additional Disclosure

The following are non-limiting, specific embodiments in accordance with the present disclosure:

A first embodiment, which is a computer-implemented method of predicting a future maintenance event of a pumping equipment on a wellbore pumping unit 34, the method comprising retrieving, by a unit controller 48, a current pump dataset, and wherein the unit controller 48 comprises a processor, non-transitory memory, and an input-output device, retrieving, by the unit controller 48, one or more datasets of periodic pumping data indicative of a pumping operation, determining a probability of a future maintenance event, a pump life value, or combinations thereof in response to a pump usage values, a design pumping procedure, a pump usage log, a pump maintenance log, or a combination thereof, and outputting, by the unit controller 48, indicia of the pump usage values exceeding a threshold value via the input-output device, wherein the indicia of the pump usage value, the threshold value, or combinations thereof comprise a visual cue, audible cue, or both.

A second embodiment, which is the method of the first embodiment, wherein the probability of a future maintenance event is determined by a predictive maintenance model.

A third embodiment, which is the method of any of the first and the second embodiments, further comprising recommending, by the predictive maintenance model, a future pump rate in response to the pump usage value exceeding a threshold value.

A fourth embodiment, which is the method of any of the first through the third embodiments, wherein the threshold value comprises i) a recommended maintenance period, ii) a required maintenance period, or combinations thereof.

A fifth embodiment, which is the method of the fourth embodiment, wherein the recommended maintenance period comprises a pump maintenance threshold with a threshold value at least one pumping operation before the future maintenance event, and wherein the required maintenance period comprises a threshold value equivalent to the pump usage value of the future maintenance event.

A sixth embodiment, which is the method of any of the first through the fifth embodiments, further comprising beginning, by the unit controller 48, the design pumping procedure, and adjusting, by the unit controller, the design pumping procedure in memory from a first pumping value to a second pumping value in response to the pump life value exceeding the threshold value for a recommended maintenance period or the threshold value for a required maintenance period, and wherein the second pumping value reduces the probability of the future maintenance event.

A seventh embodiment, which is the method of any of the first through the sixth embodiments, wherein the current pump dataset comprises a pump usage log, a pump maintenance log, a design pumping procedure, or combination thereof.

An eighth embodiment, which is the method of the seventh embodiment, wherein the pump usage log comprises pump usage values indicative of the wellbore pumping operation such as a pump flowrate, a pump pressure, a fluid volume, or combinations thereof.

A ninth embodiment, which is the method of any of the first through the eighth embodiments, further comprising updating, by the unit controller 48, the pump usage log with pump usage values, wherein a pump usage values include the one or more datasets of periodic pumping data.

A tenth embodiment, which is the method of any of the first through the ninth embodiments, wherein the pump maintenance log includes at least one past maintenance event comprising a timestamp, a component record, an identifier, a service center 238, a functional designation, or combinations thereof.

An eleventh embodiment, which is the method of any of the first through the tenth embodiments, further comprising loading, by the unit controller 48, an environmental log into a predictive maintenance model, wherein the environmental log comprises a wellbore pump unit identification, a service center 238, a wellsite environmental record corresponding to the pump usage log, or combinations thereof, and wherein the wellsite environmental record comprises an ambient temperature, a wellbore treatment fluid temperature, an operational temperature of the pumping equipment, or combinations thereof.

A twelfth embodiment, which is the method of any of the first through the eleventh embodiments, further comprising transporting a wellbore treatment blend and the wellbore pumping unit 34 to a wellsite 202, wherein the wellbore treatment blend is specified in a design pumping procedure, and connecting the wellbore pumping unit 34 to a wellhead 36, wherein the wellbore pumping unit 34 is fluidically connected to a wellbore 16.

A thirteenth embodiment, which is the method of any of the first through the twelfth embodiments, further comprising establishing a communication session, by the unit controller, via a wireless communication protocol with a mobile communication network, wherein the wireless communication protocol communicates wirelessly according to at least one of a 5G, a long term evolution (LTE), a code division multiple access (CDMA), or a global system for mobile communications (GSM) telecommunications protocol, establishing a geographical location of the wellbore pumping unit based on a location provided by the mobile communication network, and writing, by the unit controller 48, to an environmental log 850 the geographical location of the wellbore pumping unit.

A fourteenth embodiment, which is the method of any of the first through the thirteenth embodiments, wherein the predictive maintenance model is accessed via a distributed computing system.

A fifteenth embodiment, which is the method of the fourteenth embodiment, wherein the distributed computing system comprises the unit controller, at least one network location, or combinations thereof communicatively connected via a network, a mobile network, or combination thereof, and wherein the distributed computing system communicatively connects to the mobile network via a wireless communication protocol.

A sixteenth embodiment, which is the method of claim 15 the fifteenth embodiment, wherein the network location is one of i) a virtual network function (VNF) on a network slice within a 5G core network, ii) a VNF on a network slice within a 5G edge network, iii) a storage computer communicatively coupled via a mobile communication network, or iv) a computer system communicatively coupled via the mobile communication network.

A seventeenth embodiment, which is the method of the sixteenth embodiment, wherein the network location comprises a remote application, a database, a storage device, a computer system, a VNF, or combination thereof, and wherein the remote application is the predictive maintenance model.

An eighteenth embodiment, which is a method of training a machine learning process for predicting a future maintenance event of a pump equipment on a wellbore pump unit, comprising retrieving, by a machine learning process executing on a computer system at least one pumping record from a historical database 256, identifying, by the machine learning classifier, a plurality of pump usage values within a pump usage log correlated to a designed pump usage within a design pumping procedure by comparing a training set of training data comprising training pump usage values to the plurality of pump usage values, and wherein the plurality of pump usage values within the pump usage log are inputs to the machine learning process, identifying, by the machine learning classifier, a past maintenance event within a pump maintenance log by comparing a training set of training data comprising training past maintenance events within a training maintenance log, and wherein the past maintenance event within the pump maintenance log are inputs to the machine learning process, determining, by a predictive maintenance model, a probability of a future maintenance event and a corresponding pump usage value using inputs from the machine learning classifier, and wherein a pump life value correlates to the pump usage value before the future maintenance event, validating, by the machine learning process, the predictive maintenance model with at least one completed pumping record with a known future maintenance event from the historical database 256 to generate an error value, and training, by the machine learning process, the predictive maintenance model to reduce the error value.

A nineteenth embodiment, which is the method of the eighteenth embodiment, further comprising identifying, by the machine learning classifier, a plurality of designed pump usage values within the design pumping procedure by comparing a training set of training data comprising training designed pump usage values to the plurality of designed pump usage values, and wherein the plurality of designed pump usage values within the design pumping procedure are inputs to the machine learning process.

A twentieth embodiment, which is the method of the eighteenth and the nineteenth embodiments, further comprising identifying, by the machine learning classifier, a wellsite environmental record within an environmental log by comparing a training set of training data comprising training wellsite environmental records within a training environmental log, wherein the wellsite environmental record comprises a distance from a service center location to a wellsite, a road condition, an ambient temperature, a wellbore treatment fluid temperature, or combinations thereof;

A twenty-first embodiment, which is the method of any of the eighteenth through the twentieth embodiments, wherein the completed pumping record comprises a pump usage log, a pump maintenance log, an environmental log, a design pumping procedure, or combinations thereof for a first pump, wherein the design pumping procedure comprises a series of sequential stages with designed pump usage, and wherein the environmental log comprises a wellbore pump unit identification, a service center location, a wellsite environmental record corresponding to the pump usage log.

A twenty-second embodiment, which is the method of any of the eighteenth through the twenty-first embodiments, wherein the past maintenance event comprises a timestamp, a component record, an identifier, a service center 238, a functional designation, or combinations thereof, and wherein the timestamp comprises a year, a month, a day, an hour, a minute, or combinations thereof.

A twenty-third embodiment, which is the method of any of the eighteenth through the twenty-second embodiments, further comprising determining the error value from the pump usage value, the pump life value, a pump usage threshold for the future maintenance event, or combination thereof.

A twenty-fourth embodiment, which is the method of any of the eighteenth through the twenty-third embodiments, wherein the known future maintenance event is a past maintenance event within the pump maintenance log.

A twenty-fifth embodiment, which is a system of wellbore pumping unit, comprising a wellbore pumping unit comprising a mixing system comprising a supply pump, a main pump, and a plurality of sensors, a unit controller comprising a processor, a non-transitory memory, an interactive display, and a predictive maintenance model executing in memory, configured to update a pump usage log with periodic datasets indicative of a pumping operation, predict a future maintenance event via a predictive maintenance model, wherein the predictive maintenance model comprises determine a probability of a future maintenance event for a first pump in response to changes in the pump usage log when compared to a pump maintenance log, determine a pump life value comprising a percentage of pump usage before the future maintenance event, determine the pump life value in comparison to a threshold value for i) a recommended maintenance period, ii) a required maintenance period, or combinations thereof, and output an indicia of the pump life value exceeding a threshold value for i) the recommended maintenance period, ii) the required maintenance period, or combinations thereof, wherein the indicia is a visual cue, and audible cue, or both.

A twenty-sixth embodiment, which is the system of the twenty-fifth embodiment, wherein the sensors comprise a plurality of pressure sensors, flowrate sensors, valve position sensors, positional sensors, or combinations thereof.

A twenty-seventh embodiment, which is the system of any of the twenty-fifth and the twenty-sixth embodiments, wherein the wellbore pumping unit is a mud pump, a cement pumping unit, a blender unit, a water supply unit, or a fracturing pump.

A twenty-eighth embodiment, which is a computer-implemented method determining a fitness indicator for pumping equipment associated with a wellbore pumping unit, the method comprising operating, via a unit controller, the pumping equipment so as to perform a pumping operation to deliver a fluid into a wellbore, wherein the unit controller comprises a processor, a non-transitory memory, and an input-output device, collecting, via the unit controller, one or more datasets associated with the pumping operation, the one or more datasets comprising data indicative of a flowrate of the fluid, data indicative of a pressure of the fluid, data indicative of a volume of the fluid, data indicative of a parameter of the fluid, or combinations thereof, retrieving one or more historical datasets associated with the pumping equipment, the one or more historical datasets comprising historical usage data, historical maintenance data, or combinations thereof, determining the fitness indicator for the pumping equipment based upon the one or more datasets associated with the pumping operation and the one or more historical datasets, wherein the pump fitness indicator comprises a probability of an imminent maintenance event for the pumping equipment, a pump life value indicative of predicted usage of the pumping equipment before the imminent maintenance event, or combinations thereof, and outputting, via the unit controller, indicia of the fitness indicator for the pumping equipment via the input-output device, wherein the indicia of the fitness indicator for the pumping equipment comprises a visual cue, and audible cue, or both.

A twenty-ninth embodiment, which is a wellbore servicing method comprising transporting a pump unit to a wellsite, the pump unit comprising pumping equipment and a unit controller comprising a processor, a non-transitory memory, and an input-output device, fluidically connecting the pump unit to a wellbore, operating the pumping equipment so as to perform a pumping operation to deliver a fluid into the wellbore, collecting one or more datasets associated with the pumping operation, the one or more datasets comprising data indicative of a flowrate of the fluid, data indicative of a pressure of the fluid, data indicative of a volume of the fluid, data indicative of a parameter of the fluid, or combinations thereof, retrieving one or more historical datasets associated with the pumping equipment, the one or more historical datasets comprising historical usage data, historical maintenance data, or combinations thereof, determining a fitness indicator for the pumping equipment based upon the one or more datasets associated with the pumping operation and the one or more historical datasets, wherein the fitness indicator comprises a probability of an imminent maintenance event for the pumping equipment, a pump life value indicative of predicted usage of the pumping equipment before the imminent maintenance event, or combinations thereof, and outputting, via the unit controller, indicia of the fitness indicator for the pumping equipment via the input-output device, wherein the indicia of the fitness indicator for the pumping equipment comprises a visual cue, and audible cue, or both.

A thirtieth embodiment, which is the method of the twenty-ninth embodiment, further comprising reducing the pump usage values of the pumping operation when the fitness indicator indicates that the probability of the imminent maintenance event exceeds a probability threshold or when the pump life value is insufficient.

A thirty-first embodiment, which is the method of any of the twenty-ninth and the thirtieth embodiments, further comprising performing a preventative maintenance operation when the fitness indicator indicates that the probability of the imminent maintenance event exceeds a probability threshold or when the pump life value is insufficient.

A thirty-second embodiment, which is a system of wellbore pumping unit, comprising a wellbore pumping unit comprising a mixing system comprising a supply pump, a main pump, a plurality of sensors, and an input-output device, a unit controller comprising a processor, a non-transitory memory, and an input-output, configured to operate a pumping equipment so as to perform a pumping operation to deliver a fluid into a wellbore, wherein the unit controller comprises a processor, a non-transitory memory, and an input-output device, collect one or more datasets associated with the pumping operation, the one or more datasets comprising data indicative of a flowrate of the fluid, data indicative of a pressure of the fluid, data indicative of a volume of the fluid, data indicative of a parameter of the fluid, or combinations thereof, retrieve one or more historical datasets associated with the pumping equipment, the one or more historical datasets comprising historical usage data, historical maintenance data, or combinations thereof, determine the fitness indicator for the pumping equipment based upon the one or more datasets associated with the pumping operation and the one or more historical datasets, wherein the pump fitness indicator comprises a probability of an imminent maintenance event for the pumping equipment, a pump life value indicative of predicted usage of the pumping equipment before the imminent maintenance event, or combinations thereof, and output indicia of the fitness indicator for the pumping equipment via the input-output device, wherein the indicia of the fitness indicator for the pumping equipment comprises a visual cue, and audible cue, or both.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A wellbore servicing method comprising:

transporting a pump unit to a wellsite, the pump unit comprising pumping equipment and a unit controller comprising a processor, a non-transitory memory, and an input-output device:

fluidically connecting the pump unit to a wellbore;

operating the pumping equipment so as to perform a pumping operation to deliver a fluid into the wellbore;

collecting one or more datasets associated with the pumping operation;

retrieving one or more historical datasets associated with the pumping equipment;

determining a fitness indicator for the pumping equipment based upon the one or more datasets associated with the pumping operation and the one or more historical datasets, wherein the fitness indicator comprises a probability of an imminent maintenance event of the pumping equipment; and outputting, via the unit controller, indicia of the fitness indicator for the pumping equipment via the input-output device.

2. The method of claim 1, wherein the one or more historical datasets comprise historical usage data, historical maintenance data, or combinations thereof.

3. The method of claim 1, wherein the one or more datasets associated with the pumping operation comprise data indicative of a flowrate of the fluid, data indicative of a pressure of the fluid, data indicative of a volume of the fluid, data indicative of a parameter of the fluid, or combinations thereof.

4. The method of claim 1, wherein the fitness indicator further comprises a pump life value indicative of predicted usage of the pumping equipment before the imminent maintenance event.

5. The method of claim 1, wherein the fitness indicator for the pumping equipment is determined via a fitness determination model.

6. The method of claim 5, wherein the fitness determination model is trained by:

retrieving, by a machine learning process, a plurality of historical pump usage records from one or more pumping operations respectively associated with a plurality of pumping equipment;

retrieving, by the machine learning process, a plurality of historical indicia of fitness respectively associated with the plurality of pumping equipment; and training, by the machine learning process, the fitness determination model.

7. The method of claim 1, further comprising adjusting, via the unit controller, the operation of the pumping equipment during the pumping operation.

8. The method of claim 1, further comprising adjusting, via the unit controller, the operation of the pumping equipment subsequent to the pumping operation.

9. The method of claim 1, wherein the indicia of the fitness indicator for the pumping equipment comprises a visual cue, and audible cue, or both.

10. A system of wellbore pumping unit, comprising:

a wellbore pumping unit comprising a mixing system comprising a supply pump, a main pump, a plurality of sensors, and an input-output device;

a unit controller comprising a processor, a non-transitory memory, and an input-output, configured to:

operate a pumping equipment so as to perform a pumping operation to deliver a fluid into a wellbore, wherein the unit controller comprises a processor, a non-transitory memory, and an input-output device;

collect one or more datasets associated with the pumping operation;

retrieve one or more historical datasets associated with the pumping equipment;

determine a fitness indicator for the pumping equipment based upon the one or more datasets associated with the pumping operation and the one or more historical datasets, wherein the fitness indicator comprises a probability of an imminent maintenance event of the pumping equipment; and output indicia of the fitness indicator for the pumping equipment via the input-output device.

11. The system of claim 10, wherein the one or more historical datasets comprise historical usage data, historical maintenance data, or combinations thereof.

12. The system of claim 10, wherein the one or more datasets associated with the pumping operation comprise data indicative of a flowrate of the fluid, data indicative of a pressure of the fluid, data indicative of a volume of the fluid, data indicative of a parameter of the fluid, or combinations thereof.

13. The system of claim 10, wherein the fitness indicator further comprises a pump life value indicative of predicted usage of the pumping equipment before the imminent maintenance event.

14. The system of claim 10, wherein the fitness indicator for the pumping equipment is determined via a fitness determination model.

15. The system of claim 14, wherein the fitness determination model is trained by:

retrieving, by a machine learning process, a plurality of historical pump usage records from one or more pumping operations respectively associated with a plurality of pumping equipment;

retrieving, by the machine learning process, a plurality of historical indicia of fitness respectively associated with the plurality of pumping equipment; and training, by the machine learning process, the fitness determination model.

16. The system of claim 10, further comprising adjusting, via the unit controller, the operation of the pumping equipment during the pumping operation.

17. The system of claim 10, further comprising adjusting, via the unit controller, the operation of the pumping equipment subsequent to the pumping operation.

18. The system of claim 10, wherein the indicia of the fitness indicator for the pumping equipment comprises a visual cue, and audible cue, or both.

* * * * *